United States Patent [19]
Hirata et al.

[11] Patent Number: 6,141,077
[45] Date of Patent: Oct. 31, 2000

[54] LIQUID CRYSTAL DISPLAY INCLUDING PIXEL ELECTRODE(S) DESIGNED TO IMPROVE VIEWING CHARACTERISTICS

[75] Inventors: Mitsuaki Hirata; Akihiro Nammatsu; Kei Oyobe, all of Tenri; Shigeaki Mizushima, Ikoma; Noriko Watanabe, Nara; Shingo Jogan, Tenri, all of Japan

[73] Assignee: Sharp Kabushiki Kaisha, Osaka, Japan

[21] Appl. No.: 09/318,620

[22] Filed: May 26, 1999

Related U.S. Application Data

[63] Continuation of application No. 09/189,639, Nov. 10, 1998, Pat. No. 5,953,093, which is a continuation-in-part of application No. 08/816,806, Mar. 19, 1997, Pat. No. 5,872,611, which is a continuation-in-part of application No. 08/278,146, Jul. 1, 1996, abandoned.

[30] Foreign Application Priority Data

| Jul. 27, 1993 | [JP] | Japan | 5-185387 |
| Jul. 27, 1993 | [JP] | Japan | 5-185388 |
| Jul. 27, 1993 | [JP] | Japan | 5-185389 |
| Oct. 13, 1993 | [JP] | Japan | 5-256043 |

[51] Int. Cl.[7] .................................................. G02F 1/1343
[52] U.S. Cl. .......................................... 349/143; 349/144
[58] Field of Search .......................... 349/141, 139, 349/143, 144

[56] References Cited

U.S. PATENT DOCUMENTS

| 3,725,899 | 4/1973 | Greubel . |
| 3,981,559 | 9/1976 | Channin ............................. 349/141 |

(List continued on next page.)

FOREIGN PATENT DOCUMENTS

| 0407164 A2 | 9/1991 | European Pat. Off. . |
| 0445777 A3 | 9/1991 | European Pat. Off. . |
| 60-211424 | 10/1985 | Japan . |
| 1-200329 | 8/1989 | Japan . |
| 2-12 | 1/1990 | Japan . |
| 2-137819 | 5/1990 | Japan . |
| 2-171721 | 7/1990 | Japan . |
| 3-230120 | 10/1991 | Japan . |
| 4-366813 | of 1992 | Japan . |
| 4-149410 | 5/1992 | Japan . |
| 6-43460 | 2/1994 | Japan . |
| 6-43462 | 2/1994 | Japan . |
| 6-82784 | 3/1994 | Japan . |
| 6-82785 | 3/1994 | Japan . |
| 6-167711 | 6/1994 | Japan . |
| 6-281938 | 10/1994 | Japan . |
| 6-337419 | 12/1994 | Japan . |
| 2069213A | 8/1981 | United Kingdom . |

OTHER PUBLICATIONS

Patent Abstracts of Japan, vol. 17, No. 246 (P–1536) May 17, 1993 & JP–A–04 366813 (OKI) Dec. 18, 1992.
Patent Abstracts of Japan, vol. 15, No. 352 (P–1248) Sep. 6, 1991 & JP–A–03 134622 (Seiko Epson) Jun. 7, 1991.
Sumiyoshi et al., *Technical Report of IEICE, EID92–122, ED92–145*, Fed. 1993, "A Complementary Twisted Nematic With Wide–Viewing Angle Grayscale", with partial English translation.
"Two–Domain TN–LCDs Fabricated by Parallel Fringe Field Method", Lien and John, SID International Symposium—Digest of Technical Papers, vol. 24, Pt. 1, pp. 260–271, Seattle, May 16–21, 1993.

*Primary Examiner*—James A. Dudek
*Attorney, Agent, or Firm*—Nixon & Vanderhye P.C.

[57] ABSTRACT

A liquid crystal display is described which includes a pair of transparent substrates disposed opposite each other sandwiching a liquid crystal layer therebetween, with a transparent electrode and an alignment film formed on the liquid crystal layer side of each of the substrates. The transparent electrodes disposed opposite each other in pairs are at two or more different spacings at least within one display area of a pixel.

13 Claims, 25 Drawing Sheets

U.S. PATENT DOCUMENTS

| | | |
|---|---|---|
| 4,712,877 | 12/1987 | Okada et al. . |
| 4,840,460 | 6/1989 | Bernot et al. . |
| 4,850,682 | 7/1989 | Gerritsen . |
| 4,917,471 | 4/1990 | Takao et al. . |
| 4,934,791 | 6/1990 | Shimizu et al. . |
| 5,013,141 | 5/1991 | Sakata . |
| 5,040,875 | 8/1991 | Noguchi . |
| 5,066,110 | 11/1991 | Mizushima et al. . |
| 5,085,973 | 2/1992 | Shimizu et al. . |
| 5,150,235 | 9/1992 | Haim et al. . |
| 5,257,122 | 10/1993 | Dubal et al. . |
| 5,264,954 | 11/1993 | Okada . |

1 pixel 1 pixel 1 pixel

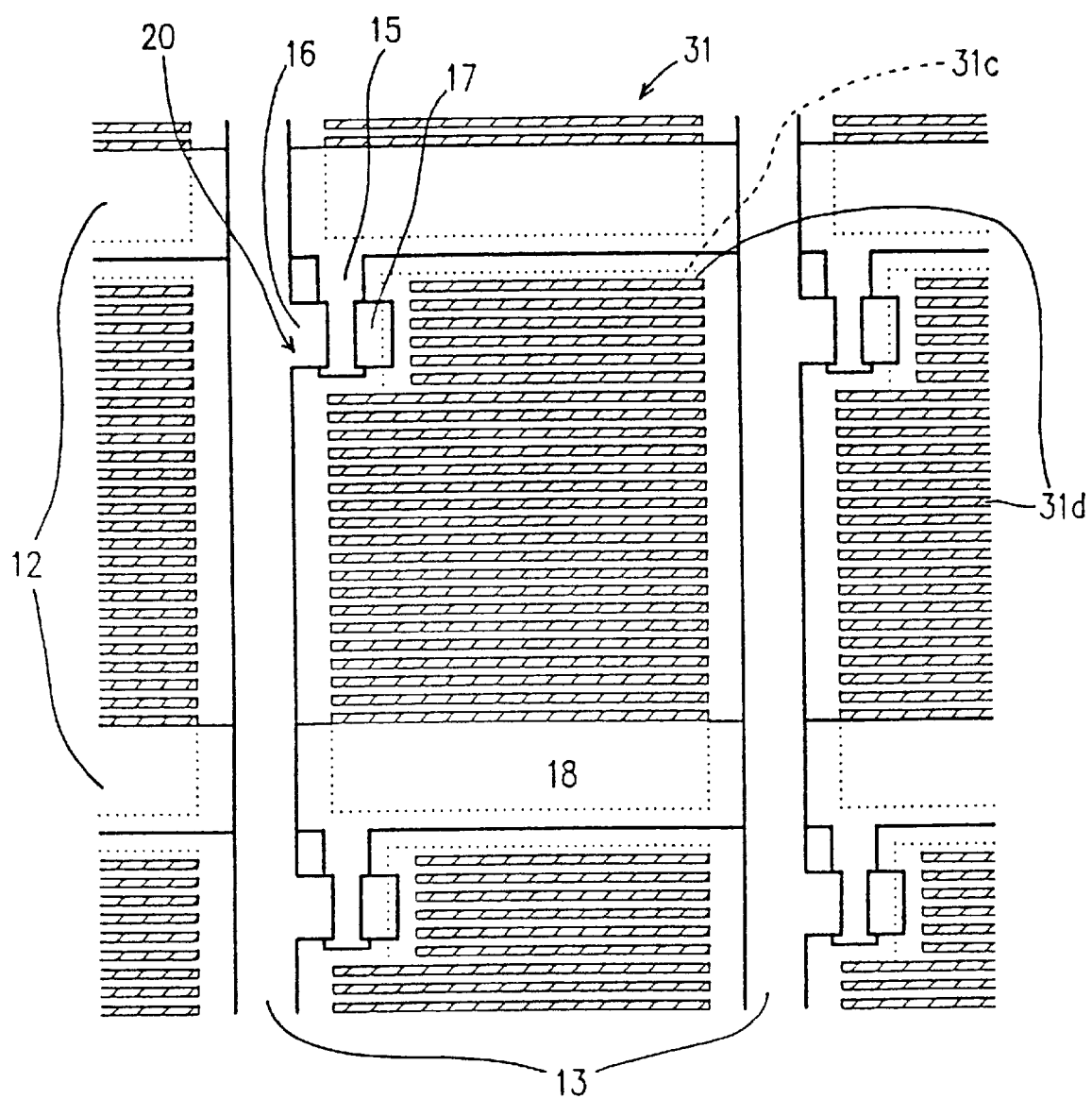

LIQUID CRYSTAL DISPLAY INCLUDING PIXEL ELECTRODE(S) DESIGNED TO IMPROVE VIEWING CHARACTERISTICS

This application is a division of Ser. No. 09/189,639, filed Nov. 10, 1998, now U.S. Pat. No. 5,953,093; which is a division of Application Ser. No. 08/816,806, filed Mar. 19, 1997, now U.S. Pat. No. 5,872,611; which is a continuation of Application Ser. No. 08/278,146, filed Jul. 21, 1996, now abandoned.

BACKGROUND OF THE INVENTION

1. Field of the Invention

The present invention relates to a liquid crystal display that can eliminate viewing angle dependence.

2. Description of the Related Art

A liquid crystal display (LCD) includes a pair of substrates and a liquid crystal layer (liquid crystal cell) sandwiched between them, and produces a display by altering the orientation of the liquid crystal molecules in the liquid crystal layer and thereby changing the optical refractive index within the liquid crystal cell. Accordingly, the liquid crystal molecules need to be aligned in an orderly manner within the liquid crystal cell.

One method commonly used to align the liquid crystal molecules in a given direction involves forming an alignment film on the liquid crystal layer side of each substrate and controlling the substrate surface condition in such a manner as to interact with the liquid crystal molecules. According to this method, a liquid crystal alignment film material is first applied on the facing surfaces of the pair of substrates, and then dried and cured to form an alignment film on each surface, and preferential orientation is given by rubbing the surface of the alignment film with a nylon cloth or the like (rubbing method).

An inorganic alignment film or an organic alignment film may be used as the alignment film for the above purpose. Oxides, organic silanes, metals, and metallic complexes are examples of the inorganic alignment film materials. As the organic alignment film materials, polyimide resins are widely used; by rubbing the polyimide film surface formed on the substrate, the liquid crystal molecules can be aligned in a given direction.

Of such liquid crystal displays, thin-film transistor (TFT) liquid crystal displays (TFT-LCDs) are constructed using twisted nematic liquid crystals. In the TN liquid crystal display, the liquid crystal molecules are arranged with their long axes lying substantially parallel to the pair of substrates and gradually twisting through 90° between them; when a voltage is applied between electrode conductive lines formed on the respective substrates and an electric field is formed in a direction perpendicular to the substrates, the molecular alignment is altered with the liquid crystal molecules being caused to line up in the direction of the electric field by virtue of the dielectric anisotropy of the liquid crystal, thus producing a change on the optical refractive index within the liquid crystal layer.

In such a TN liquid crystal display, since the liquid crystal molecules have the property of refractive index anisotropy (birefringence), a phenomenon occurs in which the contrast varies depending on the angle at which the observer views the screen of the liquid crystal display. This phenomenon will be explained with reference to FIGS. 1, 2, and 3.

FIGS. 1 and 2 are a plan view and a perspective view, respectively, of a typical TN liquid crystal display, and FIG. 3 shows a cross section taken along line F-F' in FIG. 1. The liquid crystal display is an active matrix display, and includes a pair of wiring substrates 131 and 132 and a liquid crystal layer 133 sandwiched between them. One wiring substrate 131 includes a glass substrate 111a, a transparent pixel electrode 114, and an alignment film 116a, while the other wiring substrate 132 includes a glass substrate 111b, a transparent counter-electrode 115, and an alignment film 116b.

The edges of the two wiring substrates 131 and 132 are sealed with a resin or the like (not shown) in such a manner as to surround the liquid crystal layer 133. Peripheral circuits for driving the liquid crystal layer 133, etc. are mounted outward of the sealing resin. Around the pixel electrode 114 are arranged scanning lines 112 and signal lines 113 intersecting with each other. Electrical signals are applied to the scanning line 112 and signal line 113 connected to the pixel electrode 114 to drive the liquid crystal layer through a TFT 120.

Liquid crystal molecules 133a in the liquid crystal layer 133 placed between the two wiring substrates 131 and 132 are oriented in such a manner that they twist through 90° between the two substrates 131 and 132, the average orienting direction of the liquid crystal molecules projected on the substrate being substantially parallel to the direction of line F-F'. Also, the liquid crystal molecules 133a have a pretilt angle δ with respect to the substrates 131 and 132. This pretilt angle δ is provided to prevent the occurrence of disclination lines due to multidomain; because of the pretilt angle δ, when a voltage is applied between the pixel electrode 114 and the counter electrode 115, the liquid crystal molecules 133a line up uniformly in the direction of the pretilt angle δ. In FIG. 2, the arrow 134 indicates the rubbing direction of the substrate 131 and the arrow 135 the rubbing direction of the substrate 132, while the arrow 136 indicates the positive viewing direction. Such an arrangement is also employed in liquid crystal displays of other types than the active matrix.

In conventional liquid crystal displays, however, since the direction in which the liquid crystal molecules line up when an electric field is applied is predetermined, a phenomenon occurs in which the contrast varies depending on the angle at which the observer views the liquid crystal display. The reason why this phenomenon occurs will be explained with reference to FIG. 4 showing the voltage-transmittance (V-T) characteristics of a normally white mode liquid crystal display which produces a white display when no voltage is applied. Here, when the liquid crystal molecules 133a are viewed from the θ1 side in FIG. 3, the viewing direction is said to be the positive viewing direction, and when viewed from the θ2 side, it is said to be the negative viewing direction.

When the liquid crystal display is viewed from directly above (from a direction perpendicular to the substrate plane), a V-T characteristic such as shown by solid line L1 in FIG. 4 is obtained. As can be seen, as the applied voltage value increases, the light transmittance decreases until it becomes substantially zero at a certain applied voltage value, at voltages above which the transmittance remains substantially zero.

On the other hand, the viewing angle is shifted from the direct-above position toward the positive viewing direction (θ1 side in FIG. 3), a V-T characteristic such as shown by solid line L2 in FIG. 4 is obtained. As can be seen, the light transmittance decreases with increasing applied voltage until the voltage reaches a particular value, from which point the transmittance begins to increase and then gradually decreases. This means that at a particular angle of light incidence (viewing angle) the liquid crystal molecules are tilted in the same direction and the refractive index anisotropy of the liquid crystal molecules is lost, resulting in the loss of the optical rotatory power. That is, at a particular viewing angle an inversion phenomenon (contrast reversal) occurs in which the dark and light parts of an image appear as light and dark, respectively.

Conversely, when the viewing angle is shifted toward the negative viewing direction (θ2 side in FIG. 3), the refractive index of the liquid crystal molecules becomes difficult to change and the V-T characteristic shown by solid line L3 in FIG. 4 is obtained, which indicates that the light transmittance is hard to change. As a result, contrast between black and white drops markedly.

More specifically, when the applied voltage is zero or relatively low, the center molecule 133a appears as an ellipse to the observer 137 positioned in the positive viewing direction, as shown in FIG. 5A. When the applied voltage is gradually increased, the center molecule 133a tilts toward the direction of the electric field and there is an instant in time at which the center molecule 133a appears as a true circle to the observer 137, as shown in FIG. 5B. At this time, the light transmittance is the highest. When the applied voltage is further increased, the center molecule 133a stands up substantially parallel to the direction of the electric field, as shown in FIG. 5C, and again appears as an ellipse to the observer 137. In this manner, the refractive index (Δ n) varies with the tilt angle of the liquid crystal molecule; therefore, as the viewing angle is shifted toward the positive viewing direction θ1, the inversion phenomenon in which the dark and light parts of an image appears reversed occurs at a particular angle.

In other viewing directions (the negative viewing direction) than the positive viewing direction θ1, no inversion phenomenon occurs because the V-T characteristic is different, but for the same reason as described above, there occurs a phenomenon in which the contrast ratio between black and white decreases with an increasing viewing angle.

In the TN liquid crystal display, the inversion phenomenon and decreased contrast as described above are very annoying to the observer, and make one doubt the display characteristics of the liquid crystal display.

Various methods have heretofore been proposed to improve the viewing angle characteristic peculiar to such TN liquid crystal displays and enhance the display quality. For example, Japanese Laid-open Patent Publication No. 60-211424 and The Institute of Electronics, Information and Communication Engineers, Technical Research Report ("Complementary TN (CTN)—TN with wide viewing angle—," pp. 35–41, February 1993) disclose methods in which each pixel is divided so that two or more different molecular orientations are provided. Furthermore, Japanese Laid-open Patent Publication No. 3-230120 ("Liquid Crystal Display" by Sharp Kabushiki Kaisha) proposes a method that uses a compensation plate, while Japanese Laid-open Patent Publication No. 1-200329 discloses a method for improving the viewing angle characteristic by adjusting the liquid crystal materials and liquid crystal cell thickness.

The various methods proposed for improving the viewing angle characteristic of the liquid crystal display, however, have had the following problems.

For example, the methods involving dividing every pixel and providing two or more different molecular orientations include, for example, a method in which an alignment film formed from an organic film is etched, or selectively masked by photolithography, and then subjected to rubbing so that a masked region is made a nonoriented region and an unmasked region an oriented region, thus forming differently oriented regions, especially regions with opposite orientations, within the same pixel area. According to this technique, each pixel can be formed with orientations for both the positive and negative viewing directions, so that the contrast decrease in the negative viewing direction can be prevented. However, in either method, foreign matter adheres to the alignment film or the alignment film is scratched, which may degrade the display quality of the liquid crystal display.

On the other hand, with the method involving the use of a compensation plate, the viewing angle cannot be increased on the opposite side from the side for which the compensation plate is intended, while with the method involving adjusting the liquid crystal materials and liquid crystal cell thickness, it is difficult to improve the quality of the liquid crystal display since the materials that can be used are limited.

Another known method for preventing the inversion phenomenon and contrast reduction is one disclosed in Japanese Laid-open Patent Publication No. 2-12. According to this method, which is used for an active matrix liquid crystal display, a display electrode forming each pixel is split into several parts and a capacitor is coupled to each split display electrode, making it possible to create orientations in several different directions by forming different electric fields within the same pixel, thus achieving an improvement in the viewing angle characteristic. While this method of driving the split display electrodes is effective in improving the viewing angle characteristic resulting from changes in retardation such as observed on normally black mode liquid crystal displays, little effect can be obtained in preventing the half-tone (gray-scale) inversion phenomenon caused by the tilting of liquid crystal molecules. That is, this method is effective in improving the viewing angle characteristic for normally black mode liquid crystal displays, but is not effective for normally white mode liquid crystal displays that provide good contrast.

Furthermore, all of the above-described methods have had the problem of requiring extra steps in the manufacture of liquid crystal displays, leading to increased manufacturing cost.

SUMMARY OF THE INVENTION

The liquid crystal display of this invention comprises a pair of transparent substrates disposed opposite each other sandwiching a liquid crystal layer therebetween, with a transparent electrode and an alignment film formed on the liquid crystal layer side of each of said substrates. Said transparent electrodes disposed opposite each other in pairs are at two or more different spacings at least within one display area of a pixel.

In one embodiment of the present invention, bumps and depressions are formed, using a transparent photosensitive resin, between said transparent substrates and said transparent electrodes to provide two or more different spacings between said transparent electrodes.

In another embodiment of the present invention, bumps and depressions are formed using an inorganic film between said transparent substrates and said transparent electrodes to provide two or more different spacings between said transparent electrodes.

In still another embodiment of the present invention, a portion that provides two or more different spacings between said electrodes is formed extending over two or more pixels.

According to another aspect of the present invention, the liquid crystal display comprises a pair of transparent substrates sandwiching a liquid crystal layer therebetween, and a plurality of pixels with electrodes thereof provided on a side of each of said substrates that faces said liquid crystal layer. A line-patterned insulating film is formed on at least one of said substrates in such a manner as to cover at least a part of a region corresponding to each of said pixels between said electrodes and said liquid crystal layer, said line-patterned insulating film being formed so that an average direction of direction taken over a longitudinal length of each individual line crosses substantially at right angles with an average direction of orienting directions of liquid crystal molecules projected on said substrate.

In another embodiment of the present invention, a second line-patterned insulating film made of the same material as said line-patterned insulating film is formed between adjacent lines of said line-patterned insulating film to a thickness smaller than a thickness of said line-patterned insulating film.

In still another embodiment of the present invention, a third line-patterned insulating film made of a different material from said line-patterned insulating film is formed between adjacent lines of said line-patterned insulating film.

In still another embodiment of the present invention, said third line-patterned insulating film is formed from two or more line-patterned insulating films of different materials.

In still another embodiment of the present invention, the angle that the average direction of directions taken over the longitudinal length of each individual line of said line-patterned insulating film makes with the average direction of orienting directions of liquid crystal molecules projected on said substrate, is 70° at minimum and 110° at maximum.

In still another embodiment of the present invention, said line-patterned insulating film is formed in a straight line pattern.

In still another embodiment of the present invention, said line-patterned insulating film is formed in a wavy line pattern.

In still another embodiment of the present invention, at least one of a line width and a line spacing of said line-patterned insulating film is smaller than or equal to a spacing between said pair of substrates.

In still another embodiment of the present invention, each individual line of said line-patterned insulating film is formed with tapered film walls along both longitudinal sides thereof so that liquid crystal molecules in a liquid crystal layer region on one of said longitudinal sides are oriented in a direction opposite from an orienting direction of liquid crystal molecules in a liquid crystal layer region on the other longitudinal side.

In still another embodiment of the present invention, a line width of said line-patterned insulating film is 0.5 μm at minimum and 12 μm at maximum and a line spacing of said line-patterned is larger than or equal to 0 μm but not larger than twice said line width.

In still another embodiment of the present invention, each of said tapered film walls is formed at an angle of 1° at minimum and 45° at maximum with respect to a surface of said substrate.

In still another embodiment of the present invention, said liquid crystal molecules are provided with a pretilt angle not larger than 1°.

In still another embodiment of the present invention, said line-patterned insulating film is formed on each of said two substrates in such a manner that a line pattern on one substrate is displaced widthwise from a corresponding line pattern on the other substrate.

In still another embodiment of the present invention, adjacent lines of said line-patterned insulating film are connected together at least one longitudinal end thereof.

According to still another aspect of the present invention, the liquid crystal display comprises a pair of wiring substrates disposed opposite each other sandwiching a liquid crystal layer therebetween, each of said substrates having a plurality of electrodes formed on a liquid crystal layer side thereof, each pair of electrodes on said substrates forming a pixel. One or more slit-like openings are formed per pixel in each of said electrodes on at least one of said substrates, each of said openings extending longitudinally in a direction perpendicular to an average orienting direction of liquid crystal molecules projected on said substrate, and each region forming one pixel on one substrate is made larger than a corresponding region forming one pixel on the other substrate by an arbitrary value in directions parallel to said average orienting direction, said, opposing electrodes being displaced relative to each other in two directions parallel to said average orienting direction.

In another embodiment of the present invention, said slit-like openings are formed in said pixels on both of said substrates, said slit-like openings on one substrate being displaced from said slit-like openings on the other substrate in such a manner that said slit-like openings on said one substrate are positioned alternately between said slit-like openings on said other substrate along directions parallel to said orienting direction.

In still another embodiment of the present invention, a width of each of said slit-like openings is not smaller than a spacing between said pair of wiring substrates.

In still another embodiment of the present invention, said liquid crystal molecules are provided with a pretilt angle of 0°.

According to still another aspect of the present invention, the liquid crystal display comprises a pair of wiring substrates disposed opposite each other sandwiching a liquid crystal layer therebetween, each of said substrates having a plurality of electrodes formed on a liquid crystal layer side thereof, each pair of opposing electrodes on said substrates forming a pixel. One or more line-patterned low-permittivity insulating films are formed per pixel on each of said electrodes on at least one of said substrates, each of said insulating films extending longitudinally in a direction perpendicular to an average orienting direction of liquid crystal molecules projected on said substrate, and each region forming one pixel on one substrate is made larger than a corresponding region forming one pixel on the other substrate by an arbitrary value in directions parallel to said average orienting direction, said opposing electrodes being displaced relative to each other in two directions parallel to said average orienting direction.

In another embodiment of the present invention, said line-patterned low-permittivity insulating films are formed between said liquid crystal layer and said pixels on both of said substrates, said insulating films on one substrate being displaced from said insulating films on the other substrate in such a manner that openings on said one substrate are positioned alternately between openings on said other substrate along directions parallel to said orienting direction.

In still another embodiment of the present invention, a width of each of said line-patterned low-permittivity insulating films is not smaller than a spacing between said pair of wiring substrates.

In still another embodiment of the present invention, each of said line-patterned low-permittivity insulating films has tapered edges.

In still another embodiment of the present invention, said liquid crystal molecules are provided with a pretilt angle of 0°.

According to still another aspect of the present invention, the liquid crystal display comprises a pair of wiring electrodes disposed opposite each other sandwiching a liquid crystal layer therebetween, electrodes formed on a liquid crystal layer side of each of said substrates, and a matrix array of pixels each formed between a pair of opposing electrodes on said substrates. Each of said electrodes provided on one of said paired substrates and corresponding to one pixel is formed in a comb-like shape with teeth thereof extending substantially parallel to an average orienting direction of liquid crystal molecules projected on said substrate.

In another embodiment of the present invention, a spacing between said teeth is not smaller than a spacing between said pair of wiring substrates.

According to still another aspect of the present invention, the liquid crystal display comprises a pair of wiring electrodes disposed opposite each other sandwiching a liquid crystal layer therebetween, electrodes formed on a liquid crystal layer side of each of said substrates, and a matrix array of pixels each formed between a pair of opposing electrodes on said substrates. Each of said electrodes provided on one of said paired substrates and corresponding to one pixel is provided with one or more open slits that are formed extending substantially parallel to an average orienting direction of liquid crystal molecules projected on said substrate.

In still another embodiment of the present invention, a width of each of said slits is not smaller than a spacing between said pair of wiring substrates.

Thus, the invention described herein makes possible the advantages of (1) providing a liquid crystal display with improved viewing angle characteristic for all viewing directions without degrading the display quality of the liquid crystal display and without imposing restrictions on the materials, construction, fabrication methods, etc., and (2) providing a liquid crystal display that achieves an improvement in display quality at low cost and that can be applied to normally white mode display.

These and other advantages of the present invention will become apparent to those skilled in the art upon reading and understanding the following detailed description with reference to the accompanying figures.

BRIEF DESCRIPTION OF THE DRAWINGS

FIG. 10 is a plan view showing a portion of a liquid crystal display according to Example 3 of the present invention.

DESCRIPTION OF THE PREFERRED EMBODIMENTS

The preferred examples of the present invention will be described below.

In one aspect of the invention, a pair of transparent electrodes disposed opposite each other are at two or more different spacings at least within a display area of one pixel (hereinafter simply called pixel).

The threshold voltage at which the transmittance of a liquid crystal layer begins to change is a function of the electrode spacing, as expressed by Equation (1) below. Therefore, with the electrode spacing varying within the same pixel, the threshold voltage Vth varies in the various regions within the pixel.

$$Vth = dEc = \pi \sqrt{\frac{kij}{|\Delta \varepsilon|}} \quad (1)$$

In Equation (1), d is the liquid crystal cell thickness (electrode spacing), Ec is the value of the threshold electric field at which the initial molecular alignment in the liquid crystal begins to make a transition to a different molecular alignment, and $k_{ij}$ is the elasticity of the liquid crystal material. The elasticity $k_{ij}$ indicates $k_{11}$ (splay), $k_{22}$ (twist), or $k_{33}$ (bend) according to the kind of deformation, and $k_{11}$ (homogeneous molecular alignment) or $k_{11}+(k_{33}-2k_{22})/4$ according to the kind of initial molecular alignment. Furthermore, $\Delta \varepsilon$ is the dielectric anisotropy that the liquid crystal material has.

Figure 1:
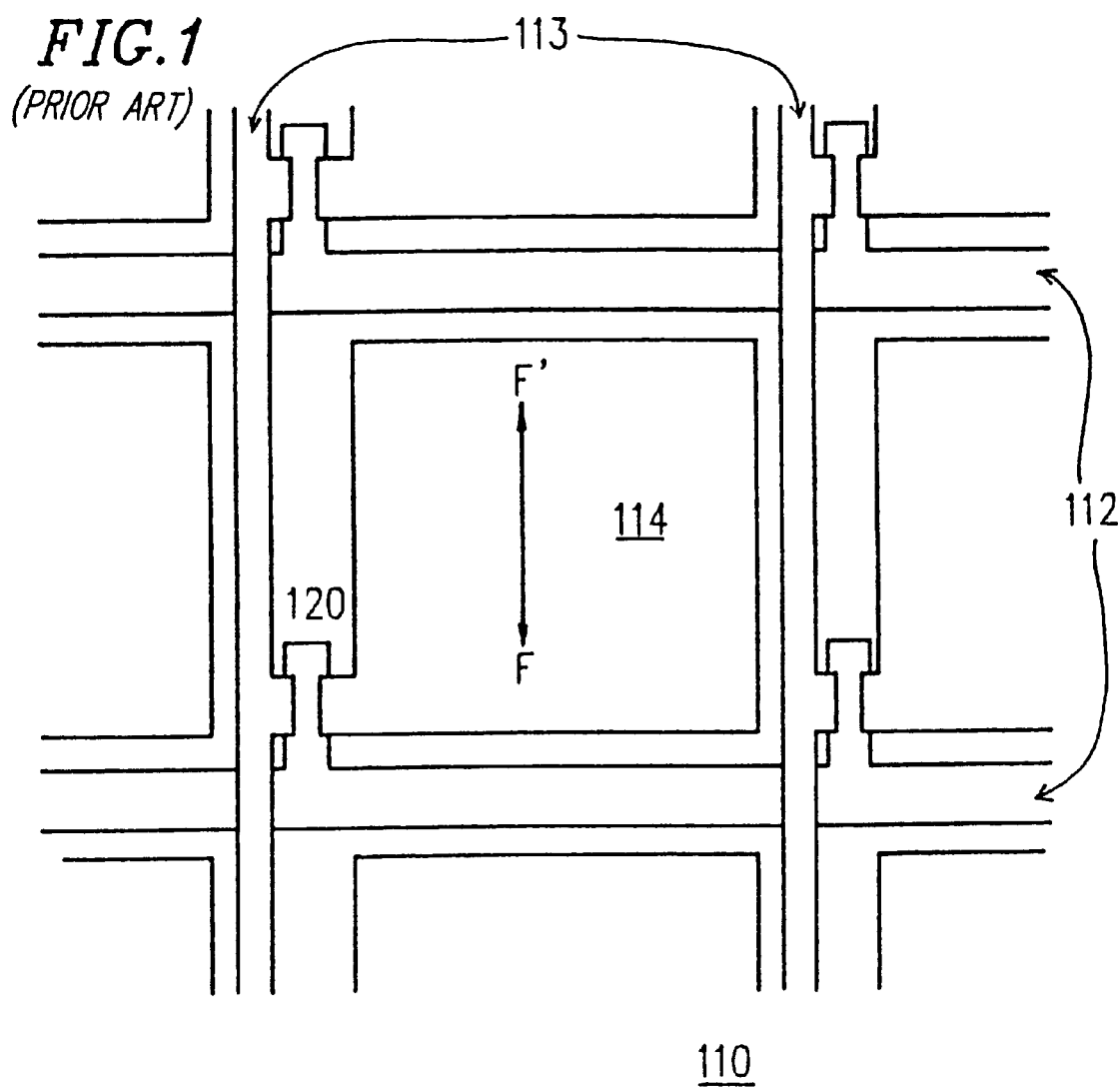
FIG. 1 is a plan view showing an example of a conventional art liquid crystal display.
Figure 2:
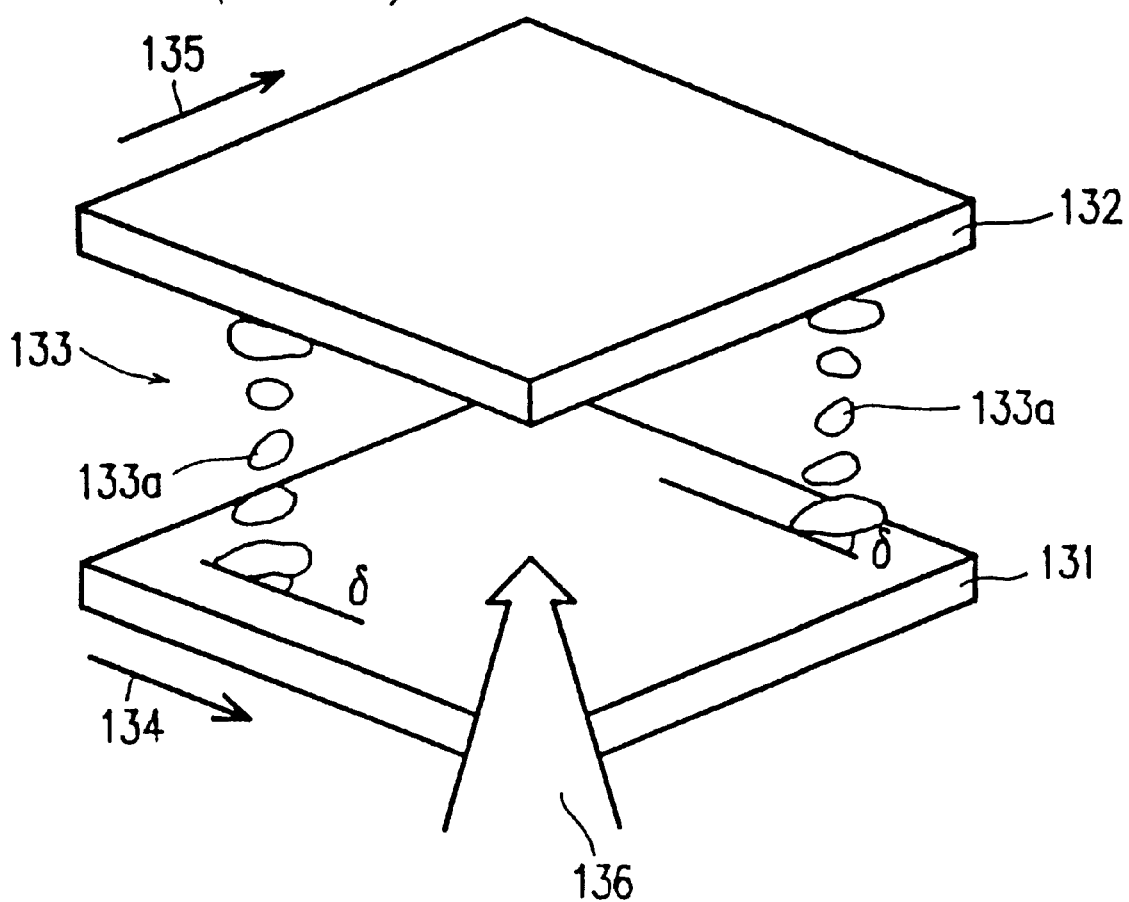
FIG. 2 is a perspective view of the conventional art liquid crystal display.
Figure 3:
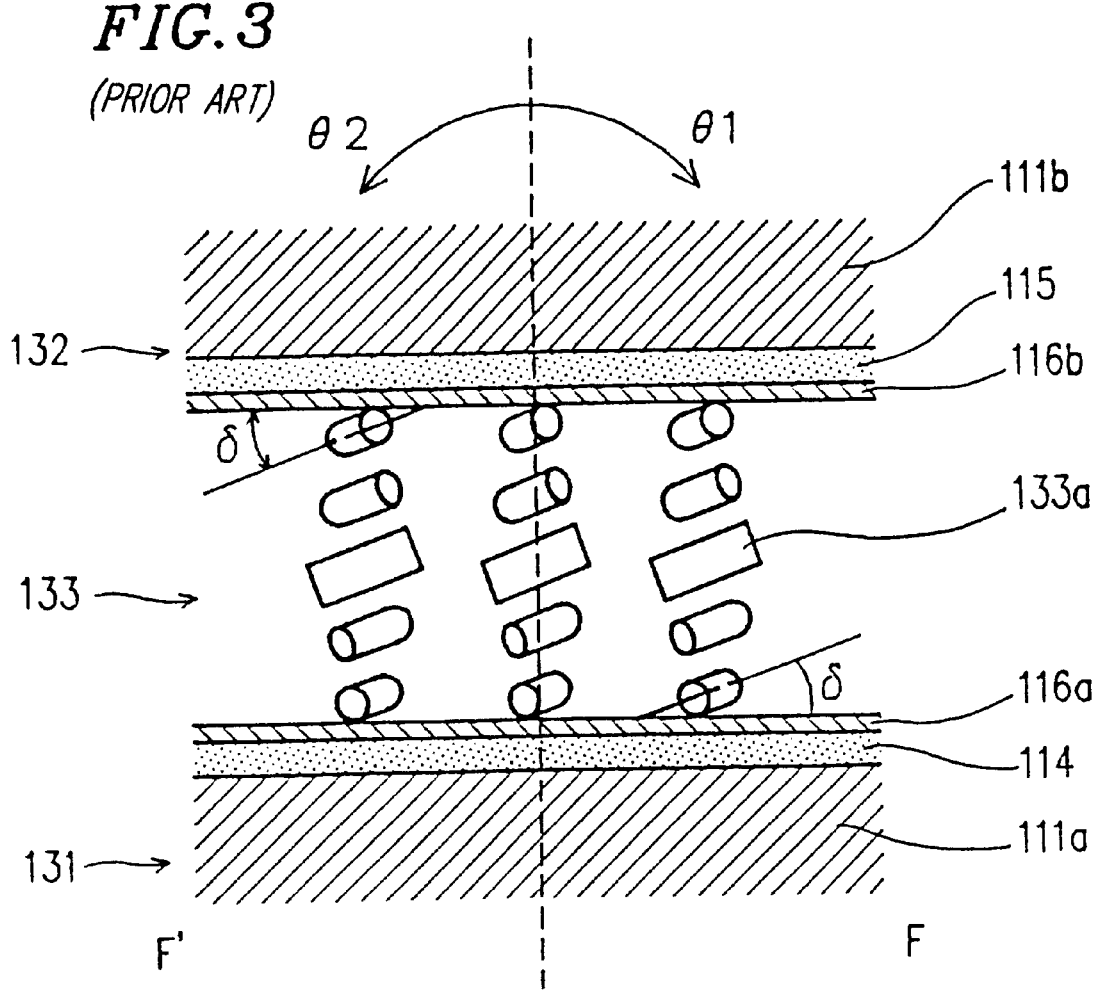
FIG. 3 is a cross-sectional view taken along line F-F' in FIG. 1.
Figure 4:
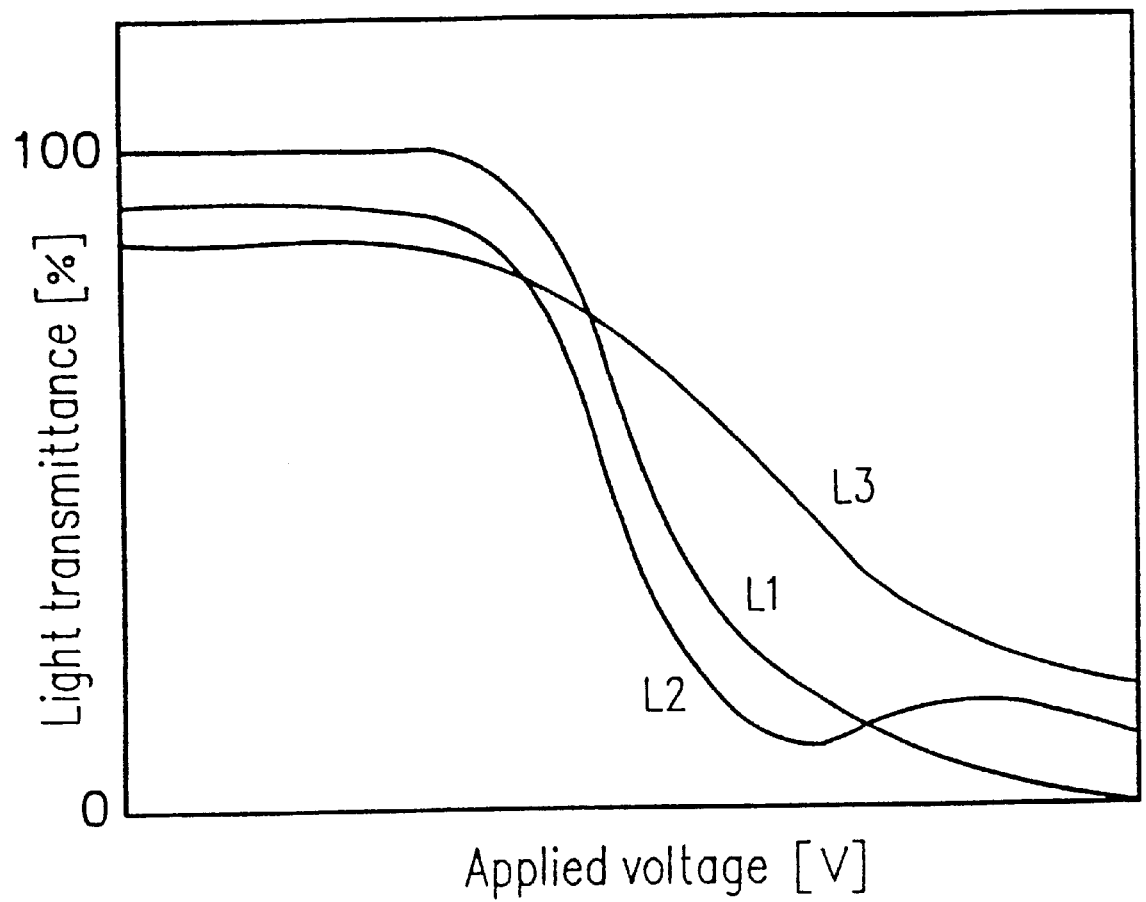
FIG. 4 is a graph showing the applied voltage - transmittance characteristics (V-T characteristics) of the conventional art liquid crystal display.
Figure 5A:
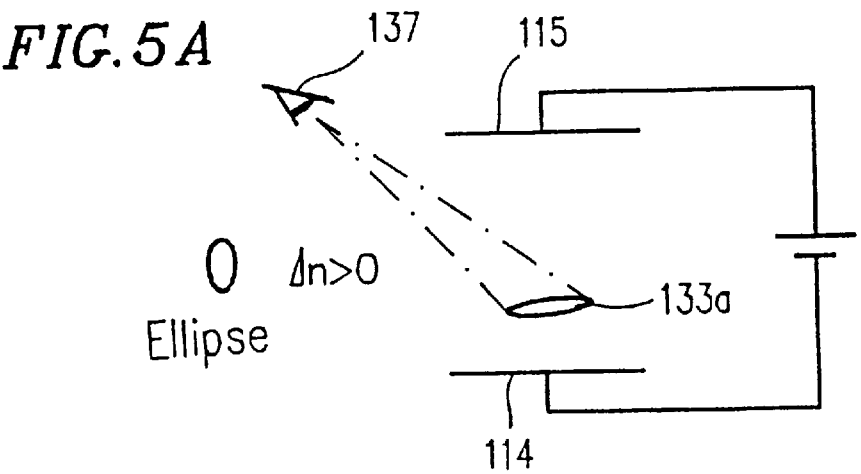
FIGS. 5A to 5C are schematic diagrams for explaining an inversion phenomenon that occurs in a liquid crystal display.
Figure 5B:
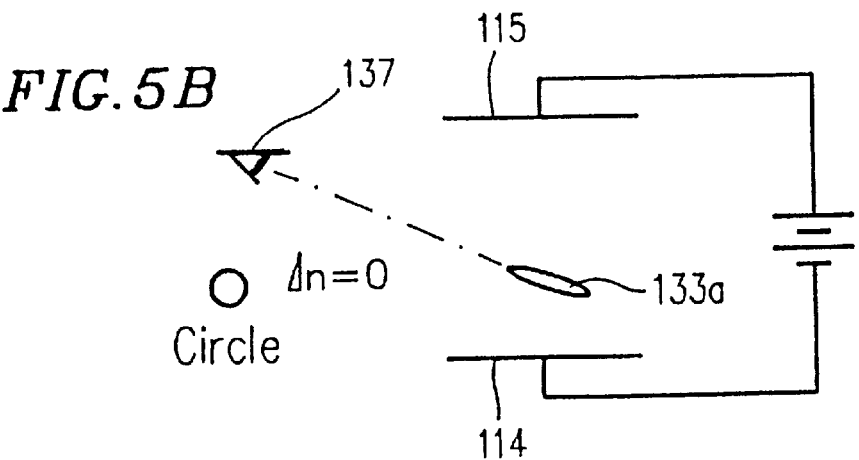
Figure 5C:
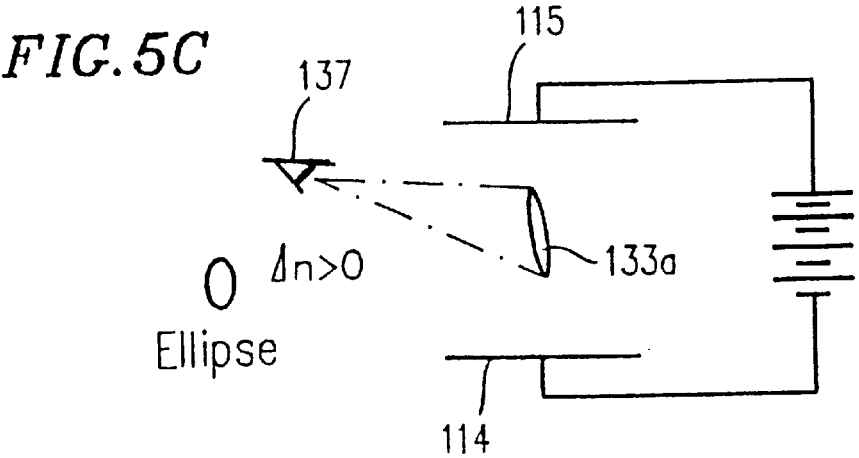
Figure 6A:
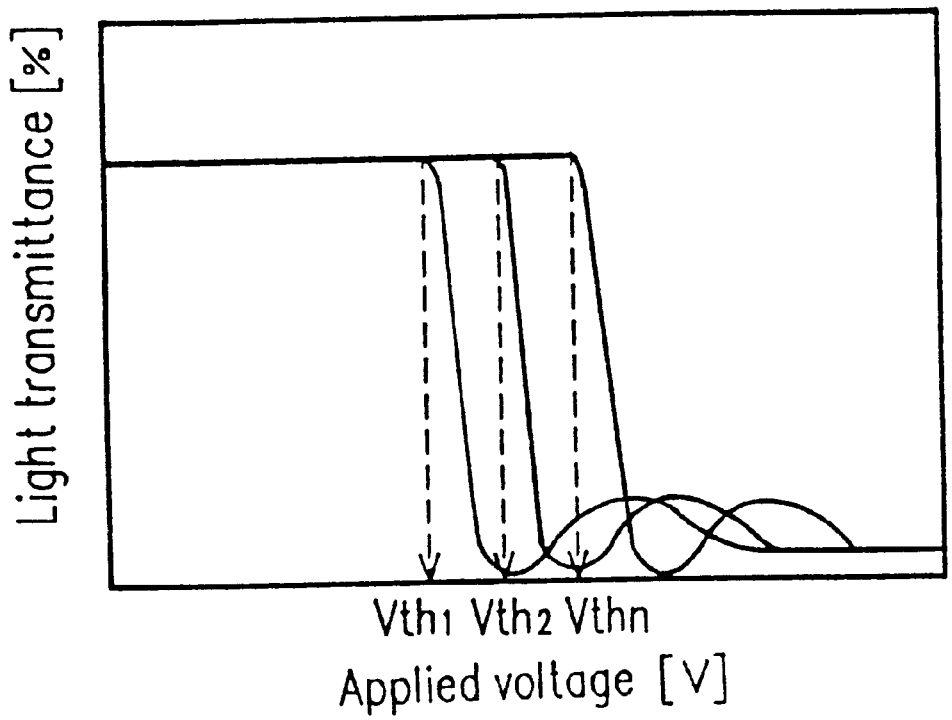
FIGS. 6A and 6B are graphs showing the applied voltage - transmittance characteristics (V-T characteristics) of a liquid crystal display according to the present invention.
Figure 6B:
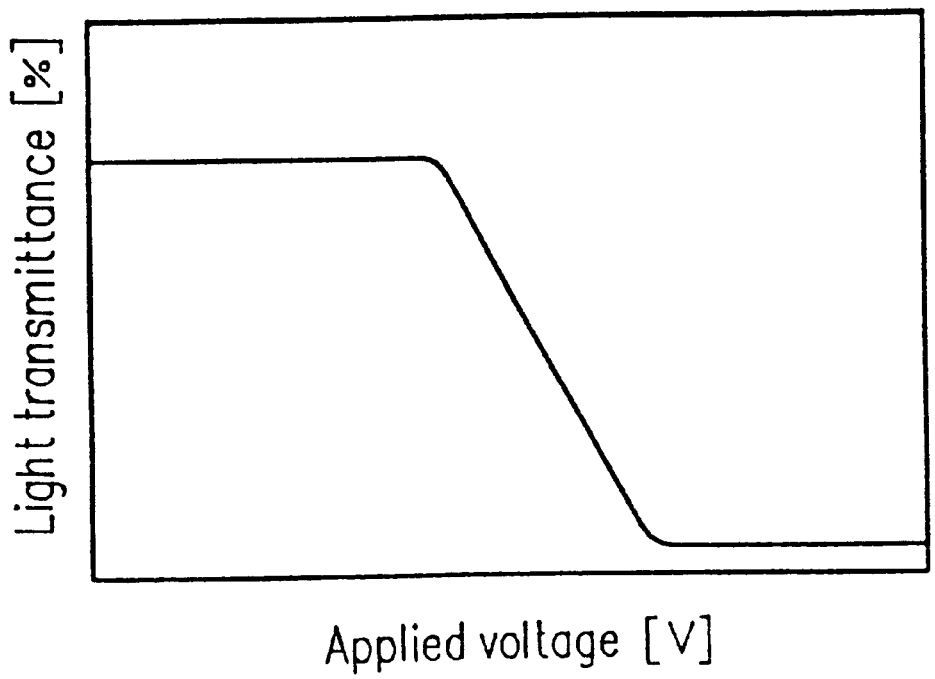

As can be seen from Equation (1), by varying the electrode spacing, various threshold values Vth can be obtained regardless of the liquid crystal material used. Accordingly, it is possible to obtain various V-T curves within one pixel, as shown in FIG. 6A. As a result, when an observer views the liquid crystal panel, these V-T curves appear combined as shown in FIG. 6B, thus relaxing the inversion phenomenon that occurs when the viewing angle is shifted toward the positive viewing direction.

Since the regions that provide different electrode spacings can be formed in any position in an orderly manner within one pixel or across two or more pixels, the viewing angle characteristic when viewed from any direction can be improved.

Examples according to the above aspect of the invention will now be described in detail below with reference to relevant drawings.

EXAMPLE 1

Figure 7:
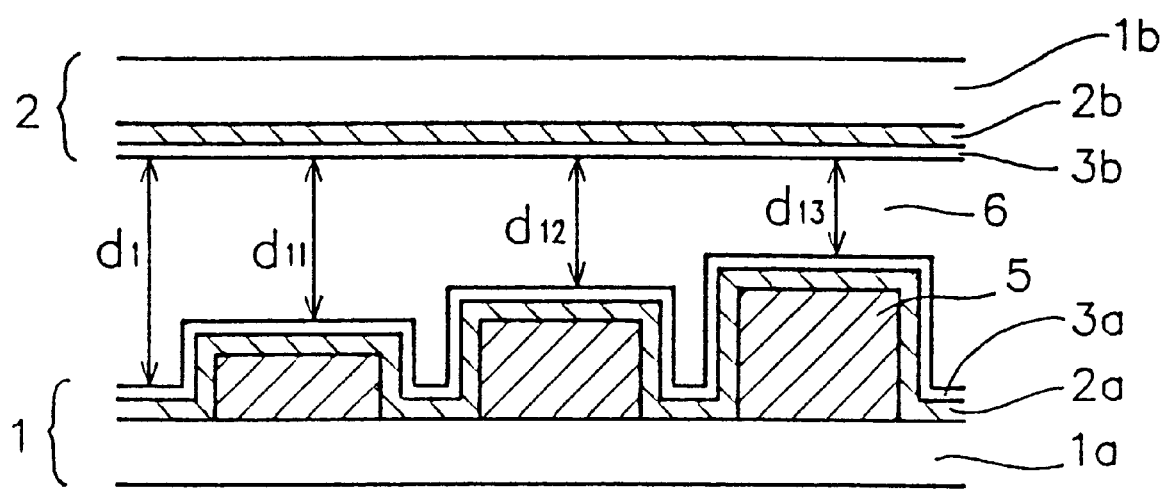
FIG. 7 is a schematic cross-sectional view of a liquid crystal display according to Example 1 of the present invention.

FIG. 7 shows a cross section of a one-pixel area in a liquid crystal panel of a liquid crystal display according to one example of the invention. As illustrated, the liquid crystal panel includes a transparent glass substrate 1a, bumps 5 of various heights formed thereon, and a transparent electrode 2a formed over the bumps 5. On top of the transparent electrode 2a is formed an alignment film 3a which is processed for orientation. Furthermore, a transparent electrode 2b and an alignment film 3b are formed on top of a transparent substrate 1b, the alignment film 3b being processed for orientation. The substrates 1 and 2 are placed opposite each other with a liquid crystal layer 6 sandwiched between them.

The fabrication of this liquid crystal panel is performed in the following sequence. First, an acrylic film is transferred onto the transparent glass substrate 1a, to form the bumps 5 of various heights. The height of the bumps 5 can be set at various values to provide the desired electrode spacings. In the present example, the heights of the bumps are set to provide electrode spacings d1=10 μm, d11=8 μm, d12=5 μm, and d13=3 μm.

Next, in the same manner as in the manufacture of conventional liquid crystal panels, the transparent electrode 2a is formed by depositing an ITO (indium tin oxide) transparent conductive film or the like. On top of the transparent electrode 2a, polyimide or like material is applied to form the alignment film 3a which is then processed for orientation, thus completing the substrate 1.

In the same manner as above, the transparent electrode 2b and the alignment film 3b are formed on top of the glass substrate 1b, and the alignment film 3b is processed for orientation, to complete the other substrate 2.

Thereafter, the substrates 1 and 2 are placed facing each other so that the liquid crystal cell thickness is set at about 10 μm, and liquid crystal molecules, plastic beads, etc. are sealed between them to form the liquid crystal layer 6, thus completing the fabrication of the liquid crystal panel.

Figure 8A:
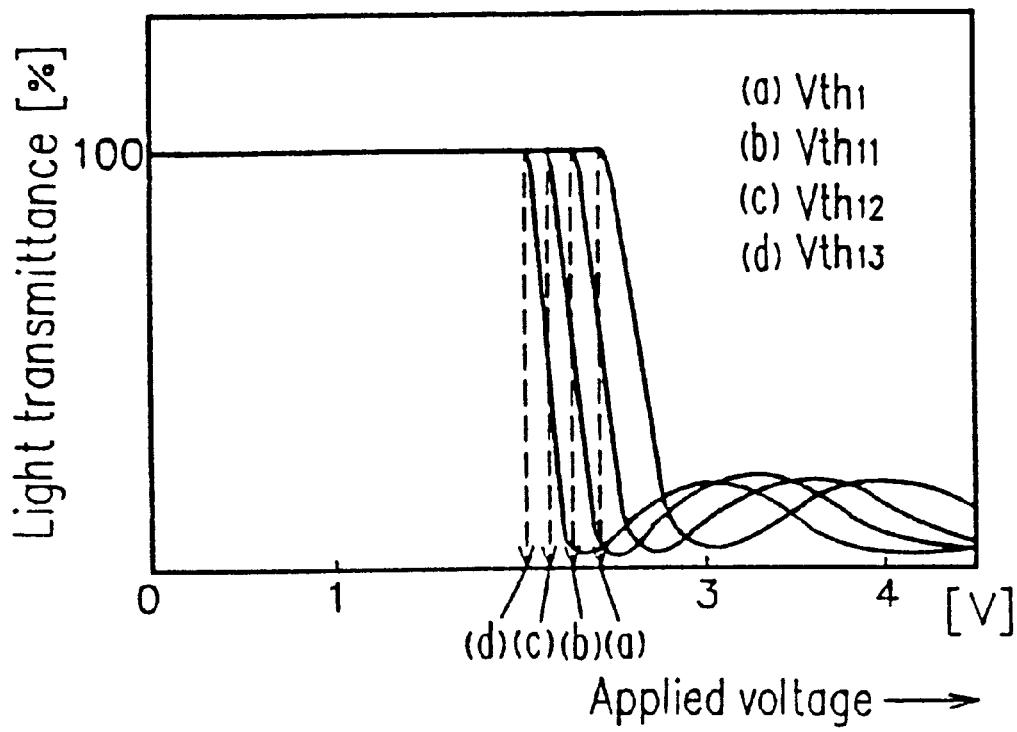
FIGS. 8A and 8B are graphs showing the applied voltage - transmittance characteristics (V-T characteristics) of the liquid crystal display of Example 1.
Figure 8B:
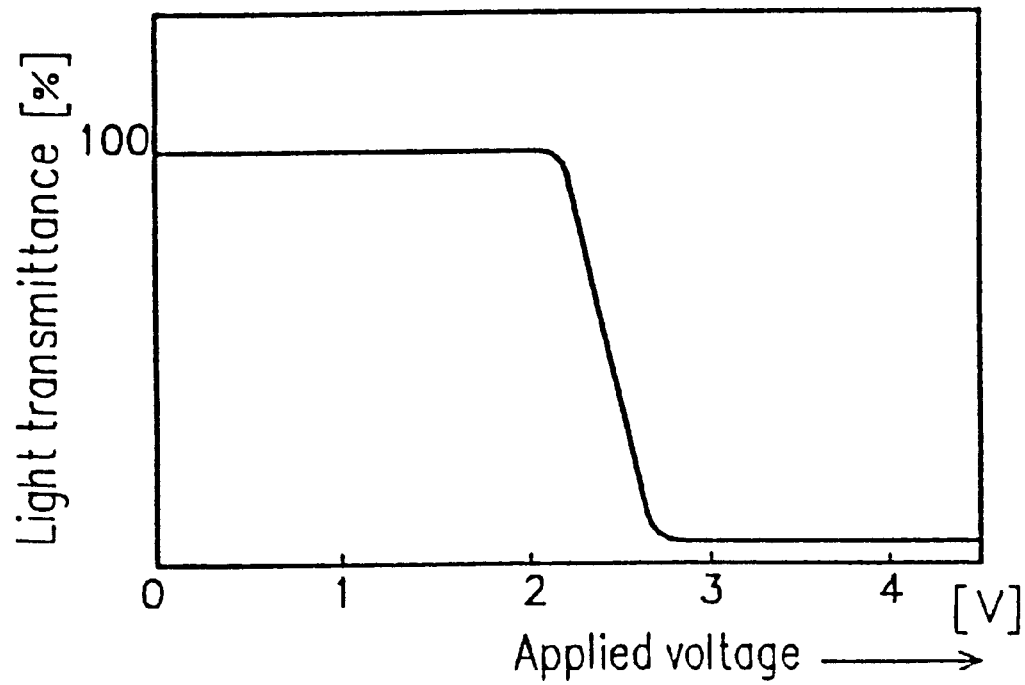

When a 30-Hz square wave voltage was gradually applied to this liquid crystal panel and the liquid crystal panel was viewed from a position at an angle of 40° with respect to the positive viewing direction, a V-T characteristic as shown in FIG. 8B was obtained and no inversion phenomenon was observed. This is because of the presence of the bumps 5 of different heights in each pixel, providing different threshold voltages Vth1, Vth11, Vth12, and Vth13 at positions with different electrode spacings d1, d11, d12, and d13. Thus, the apparent V-T curve is a combined form of the individual V-T curves, and as a result, a good viewing angle characteristic free from inversion phenomenon can be obtained when viewed from any direction.

EXAMPLE 2

In this example, an inorganic film such as SiN was formed on the substrate 1a and etched to form the bumps 5. The resulting liquid crystal panel showed a good viewing angle characteristic, as in Example 1.

Figure 9A:
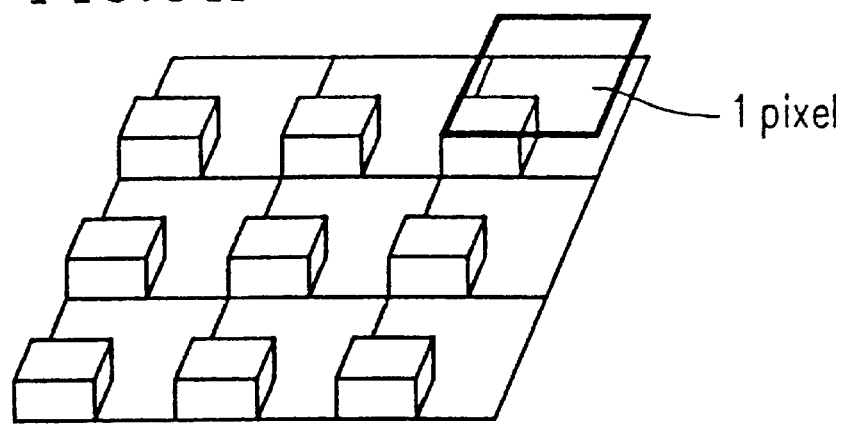
FIGS. 9A to 9C are schematic diagrams showing bump/depression patterns in the liquid crystal display of the present invention.
Figure 9B:
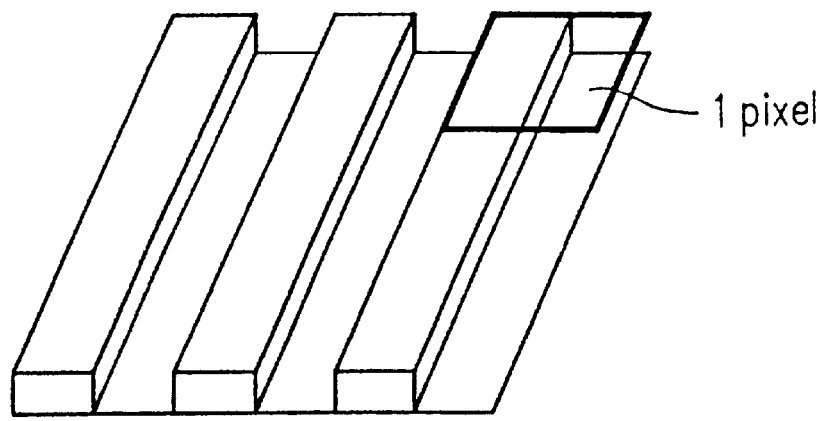
Figure 9C:
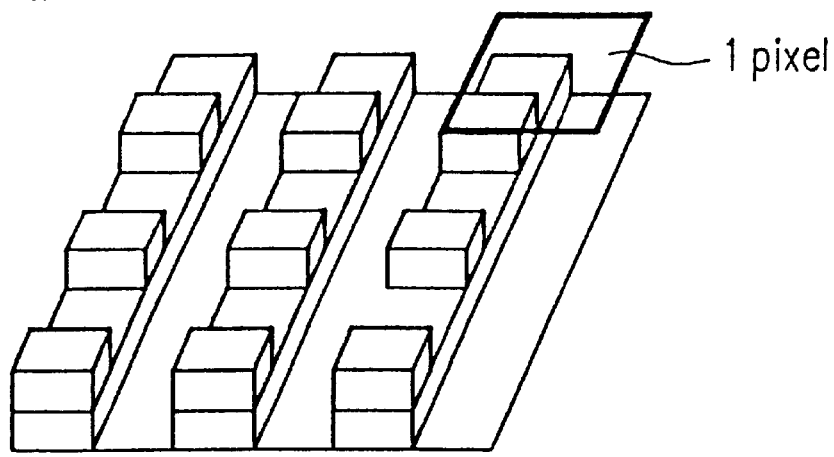

In the above examples, the bumps 5 of different heights were formed within each single pixel. Instead of forming an individual bump pattern within each pixel as shown in FIG. 9A, a bump pattern extending over two or more pixels may be formed as shown in FIG. 9B. It is also possible to form bumps on top of each bump pattern formed extending over two or more pixels, as shown in FIG. 9C. In FIGS. 9A to 9C, a square marked by a thick solid line indicates one pixel.

Any of the above examples has dealt with a black and white duty panel, but it will be appreciated that the present invention can also be applied to active matrix liquid crystal panels using switching devices such as TFTs and also to color liquid crystal panels using color filters.

As is apparent from the above description, in the present aspect of the invention, various threshold voltages Vth can be obtained regardless of the liquid crystal material by varying the electrode spacing within each pixel. Accordingly, it is possible to obtain various V-T curves within each pixel; when the observer views the liquid crystal panel, these V-T curves appear combined together, and thus, the problems of inversion phenomenon in the positive viewing direction and contrast reduction in the negative viewing direction can be alleviated. Furthermore, the regions that provide different electrode spacings can be formed in any positions within one pixel or across two or more pixels, and the alignment films are free from scratches and foreign matter. As a result, the viewing angle characteristic when viewed from any direction can be improved without imposing limitations on the structure or on the fabrication process.

In another aspect of the present invention, a line-patterned insulating film is formed in such a manner that an average direction of directions taken over the longitudinal length of each individual line crosses substantially at right angles with an average direction of orienting directions of the liquid crystal molecules projected on the substrate. As a result, when a voltage is applied to the liquid crystal layer, the angle at which the liquid crystal molecules in the portions of the liquid crystal layer where no line-patterned insulating film is formed are caused to line up is different from the angle at which the liquid crystal molecules in the portions of the liquid crystal layer where the line-patterned insulating film is formed are caused to line up under the same condition. The different angles at which the molecules are caused to line up result in different molecular alignments within the same pixel.

Such different molecular alignments can be obtained not only by forming the insulating film in a line pattern but by varying the thickness or the material.

Examples according this aspect of the invention will be described in detail below with reference to relevant drawings.

EXAMPLE 3

Figure 11:
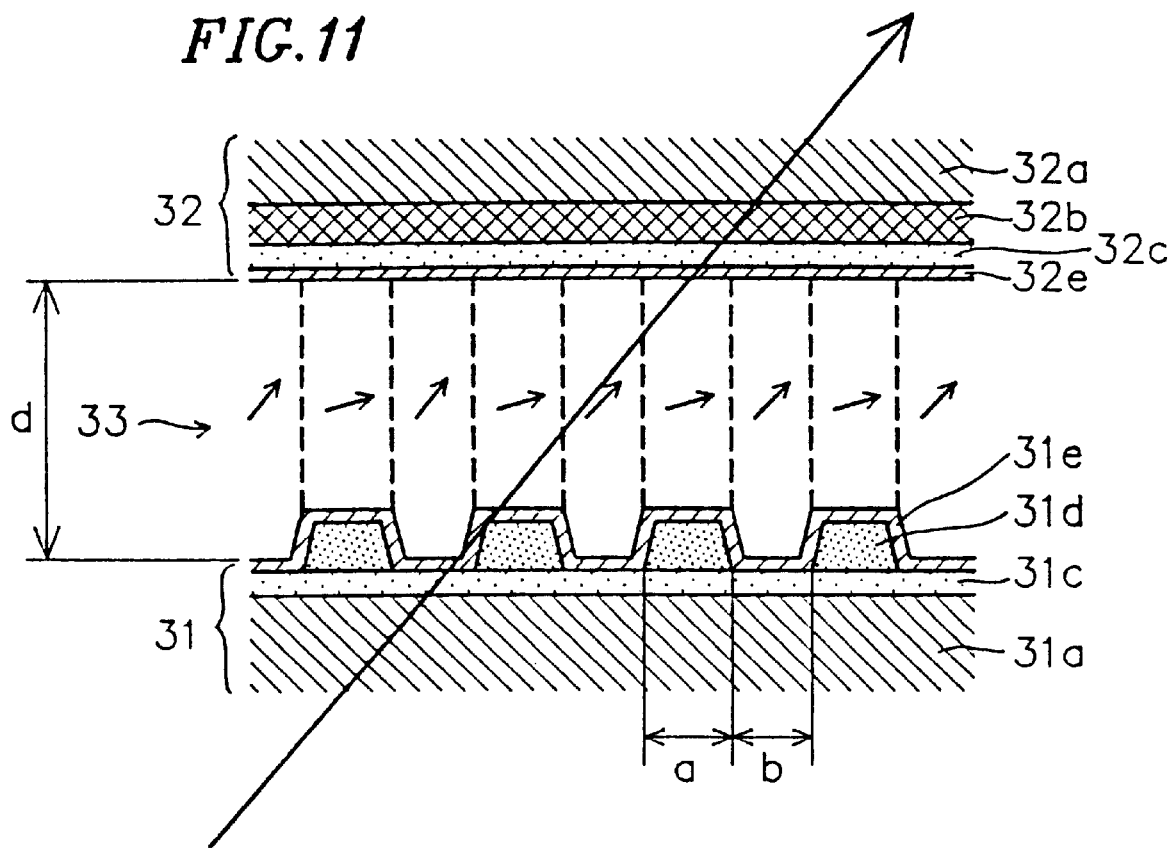
FIG. 11 is a cross-sectional view of an active matrix substrate forming part of the liquid crystal display of FIG. 10.

FIG. 10 is a plan view showing a portion of a TN active matrix liquid crystal display embodying the present invention, and FIG. 11 is a cross-sectional view showing an active matrix substrate which forms part of the liquid crystal display. In this liquid crystal display, a liquid crystal layer 33 is sealed between an active matrix substrate 31 and a counter substrate 32 disposed opposite each other. The active matrix substrate 31 includes a glass substrate 31a on which a transparent electrode (pixel electrode) 31c, a line-patterned insulating film 31d, and an alignment film 31e are formed, while the counter substrate 32 includes a glass substrate 32a on which a color filter 32b, a transparent electrode 32c, and an alignment film 32e are formed. Liquid crystal molecules in the liquid crystal layer 33 are aligned in such a manner as to twist through 90° between the substrates 31 and 32. The edges (not shown) of the substrates 31 and 32 are sealed with a resin or the like, and peripheral circuits (not shown), etc. are mounted.

In the active matrix substrate 31, scanning lines 12 and signal lines 13 are formed intersecting with each other on the insulating glass substrate 31a, as shown in FIG. 10. Near each intersection of the scanning lines 12 and signal lines 13 is formed a thin-film transistor (hereinafter referred to as the TFT) 20 that acts as a switching device. In the present example, the TFT 20 is an amorphous silicon TFT. The TFT 20 may be formed on each scanning line 12.

Each TFT 20 is connected to one of a plurality of pixel electrodes 31c formed in a matrix array, and also connected electrically to one scanning line 12 and one signal line 13. The connection of the TFT 20 to the scanning line 12 is accomplished by using a gate electrode 15 formed on the insulating substrate 31a and branching out from the scanning line 12; the connection of the TFT 20 to the signal line 13 is accomplished by using a source electrode 16 branching out from the signal line 13 and partially extending over the gate electrode 15; and the connection of the TFT 20 to the pixel electrode 31c is accomplished by using a drain electrode 17 a portion of which lies above the gate electrode 15.

The pixel electrode 31c is formed in such a manner as to overlap a scanning line 12 adjacent to the scanning line connected to the TFT 20. The overlapping portion forms a capacitor 18. Alternatively, a capacitance line may be formed separately from the scanning line 12 and the capacitor 18 may be formed on the capacitance line.

A plurality of insulating film lines 31d are formed parallel to each other on the pixel electrode 31c except where the capacitor 18 is formed. These insulating film lines 31d are provided to improve viewing angle dependence. The presence of the insulating film lines 31d also serves to prevent shorting due to the inclusion of foreign matter in the liquid crystal layer and stabilizes the TFT performance. The insulating film lines 31d are formed by first depositing a silicon nitride film of 600 nm thickness over the entire surface of the insulating substrate 31a using a CVD process, for example, and then patterning the film in a line pattern. At this time, the insulating film lines 31d are formed in such a manner that an average direction of directions taken over the longitudinal length of each individual line crosses substantially at right angles with an average direction of orienting directions of the liquid crystal molecules projected on the substrate 31a, and preferably within the range of 90°±20°. Since the insulating film lines 31d can be formed in the same processing step of patterning an insulating protective film usually formed between the pixel electrode 31c and the liquid crystal layer 33, no extra fabrication steps are needed.

On the substrate 31a with the insulating film lines 31d is formed the alignment film 32e for controlling the orientation of the liquid crystal molecules. The alignment film 32e is subjected to rubbing.

In the above-constructed liquid crystal display of the present example, the insulating film lines 31d are formed parallel to each other with their longitudinal sides extending generally in a direction crossing substantially at right angles with the average orienting direction of the liquid crystal molecules projected on the substrate. In this structure, when a voltage is applied between the pixel electrode 31c and the transparent electrode 32c across the liquid crystal layer 33, as shown in FIG. 11, the strength of the electric field applied to the liquid crystal layer is different where no insulating film lines 31d are formed than where the insulating film lines 31d are formed. As a result, in those portions of the liquid crystal layer where no insulating film lines 31d are formed, i.e., in each position corresponding to spacing b between the insulating film lines 31d, the liquid crystal molecules line up, in response to the applied voltage, at a different angle (shown by an arrow) than the angle (shown by another arrow) at which the liquid crystal molecules are caused to line up under the same condition in those portions of the liquid crystal layer where the insulating film lines 31d are formed, i.e., in each position corresponding to the line width a of each insulating film line 31d.

The different angles at which the molecules in the pixel are caused to line up result in different molecular alignments within the same pixel. In this situation, light incident obliquely (indicated by a large arrow) on the liquid crystal display passes through the liquid crystal layer regions with different molecular alignments, and therefore, the optical rotatory power is not lost completely. This suppresses the inversion phenomenon of half-tone portions, and thus can improve viewing angle dependence in a normally white mode liquid crystal display as well. From the standpoint of improving the viewing angle dependence, it is preferable that the insulating film lines 31d be formed with their longitudinal sides crossing at 90°±20° with the average orienting direction of the liquid crystal molecules projected on the substrate.

Furthermore, when the line width a or line spacing b of the line-patterned insulating film 31d is made smaller than the thickness d of the liquid crystal layer 33, the viewing angle characteristic can be improved, particularly for 20° and greater viewing angles where the inversion phenomenon of half-tone portions can occur most conspicuously. Preferably, the width a or the spacing b should be made less than d/2.7.

In this example, silicon nitride is used as the material of the insulating film lines 31d, but this is only an example; other materials may be used such as inorganic insulating films formed of aluminum, tantalum or silicon oxides or their nitrides, or organic insulating films formed of polyimide, polyamide, or polystyrene. The same applies to the insulating protective film.

When an organic insulating film such as mentioned above is used, a film of about 100 nm thickness is first formed by screen printing, for example, and then patterned by photo-lithography or by photolysis using deep UV (wavelength 250 nm). The patterning can also be performed using a printing process. Furthermore, such an organic insulating film can also be used as the alignment film 31e.

EXAMPLE 4

In this example, a wavy-line-patterned insulating film is used instead of the straight-line-patterned insulating film.

Figure 12:
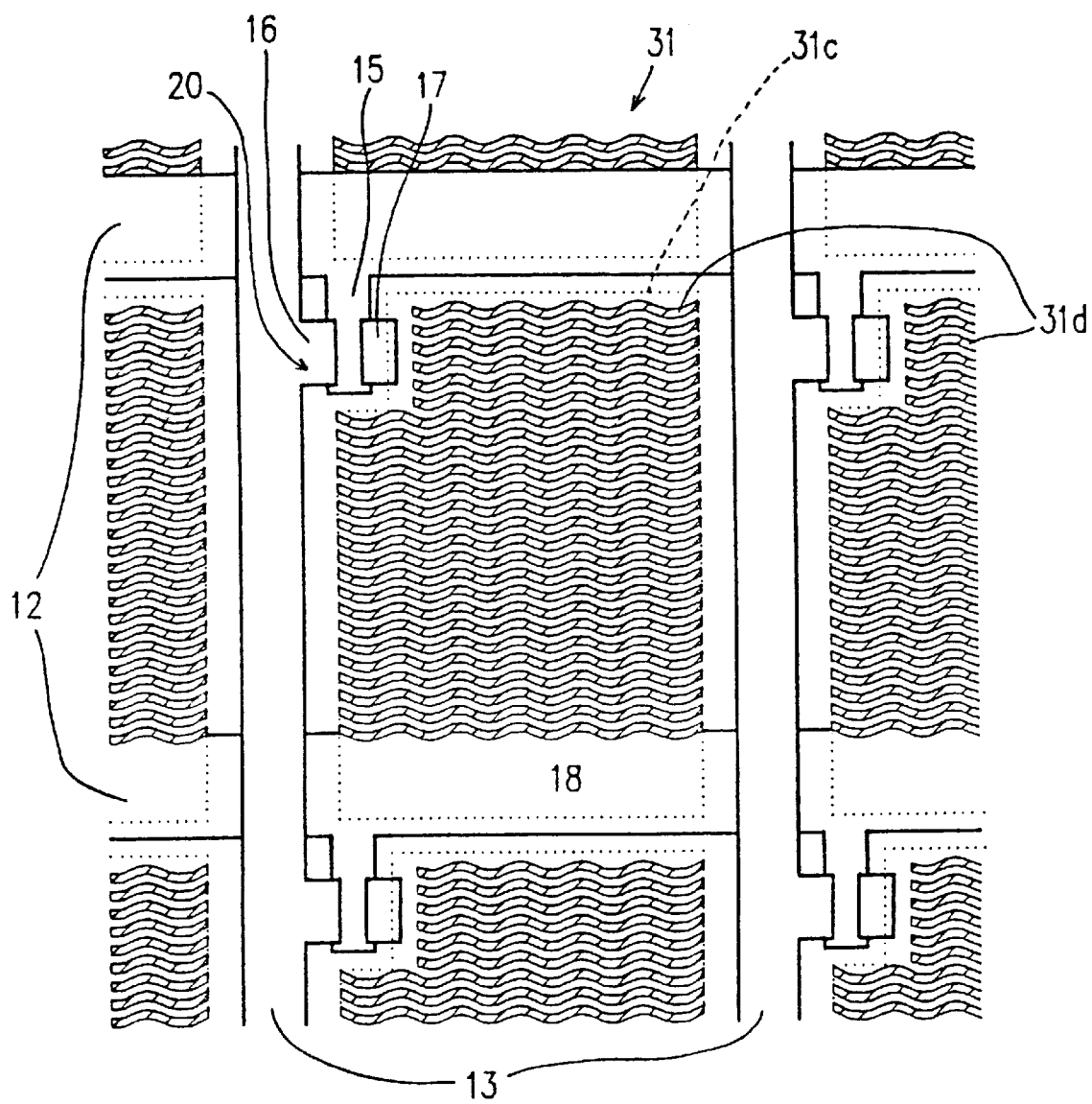
FIG. 12 is a plan view showing a portion of a liquid crystal display according to Example 4 of the present invention.

FIG. 12 is a plan view showing an active matrix substrate 31 on which wavy insulating film lines 31d are formed. The same parts as those shown in FIG. 10 are designated by the same numerals. In this example also, the insulating film lines 31d are formed in such a manner that an average direction of directions taken along the longitudinal length of each individual film line, though it makes its way in zigzag directions, crosses substantially at right angles with an average direction of orienting directions of the liquid crystal molecules projected on the substrate 31a. By forming the insulating film lines 31d in this manner, viewing angle dependence can be eliminated, as in the case of Example 3.

In this example, the insulating film is formed in a wavy line pattern, but alternatively, it may be formed in a triangular wave pattern or other curved pattern.

EXAMPLE 5

In this example, each insulating film line is formed in a tapered shape sloping down on both longitudinal sides thereof.

Figure 13:
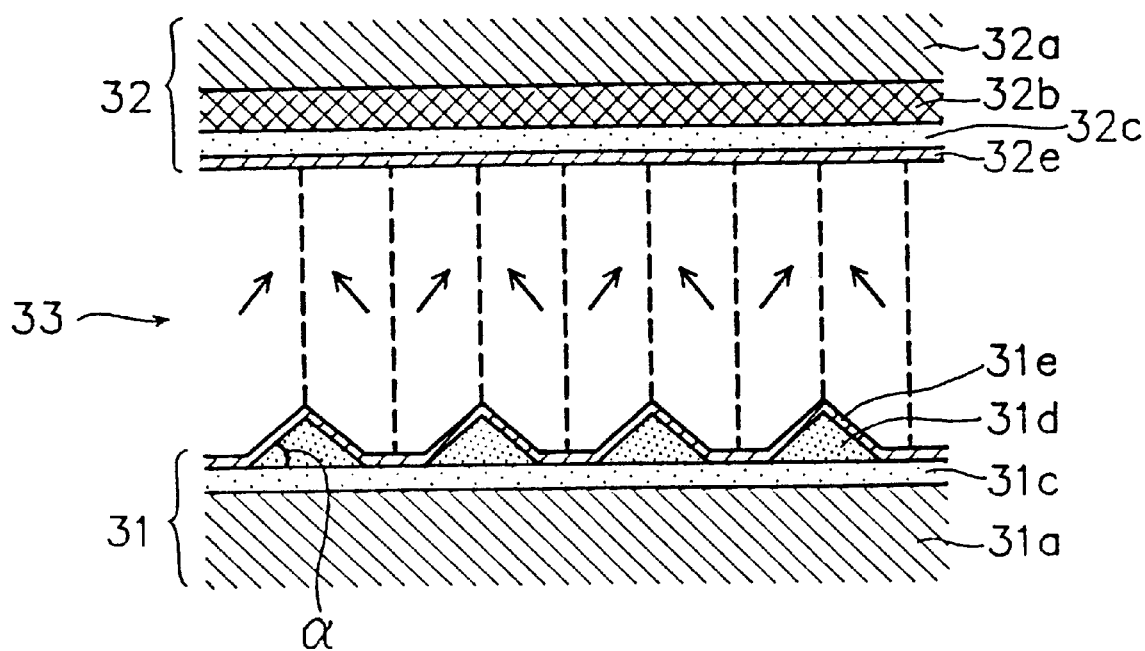
FIG. 13 is a cross-sectional view showing a portion of a liquid crystal display according to Example 5 of the present invention.

Figure 13 is a cross-sectional view of a liquid crystal display according to this example. In this liquid crystal display, the insulating film lines 31d are each formed in a tapered shape sloping down on both longitudinal sides thereof. The longitudinal sides of the insulating lines 31d can be formed in a sloped shape by isotropic etching or by a photoresist etchback technique.

In the structure of this example, by making the pretilt angle of the liquid crystal molecules smaller than the taper angle a of the associated film side, the liquid crystal molecules on both tapered sides of each film line can be provided with opposite tilt angles, as shown in FIG. 13, which serves to eliminate viewing angle dependence for both the positive and negative viewing directions. On the other hand, when the pretilt angle of the liquid crystal molecules is made greater than the taper angle a of the associated film side, the inversion phenomenon of half-tone portions can be prevented, which serves to improves the viewing angle dependence of the liquid crystal display, as in the liquid crystal display shown in FIG. 12.

The taper angle a should preferably be set within a range of 1° to 45° with respect to the substrate surface. With the taper angle a thus set, the liquid crystal molecules can be provided in a further reliable manner with pretilt angles in both the normal and opposite directions, so that the viewing angle dependence in both the positive and negative viewing directions can be eliminated efficiently.

Furthermore, the pretilt angle should preferably be set at 1° or less. In addition to setting the pretilt angle at 1° or less, the line width a and the line spacing b of the line-patterned insulating film 31d should preferably be set at 0.5 $\mu m \leq a \leq 12$ $\mu m$ and $0 < b < 2a$, respectively. When the angle that the average longitudinal direction of the insulating film lines 31d makes with the rubbing direction of the alignment film 31e for controlling the orientation of the liquid crystal molecules, is set within the range of 90°±20°, the elimination of the viewing angle dependence can be further ensured.

EXAMPLE 6

This example is concerned with a structure in which a second line-patterned insulating film of the same material is formed between the insulating film lines.

Figure 14:
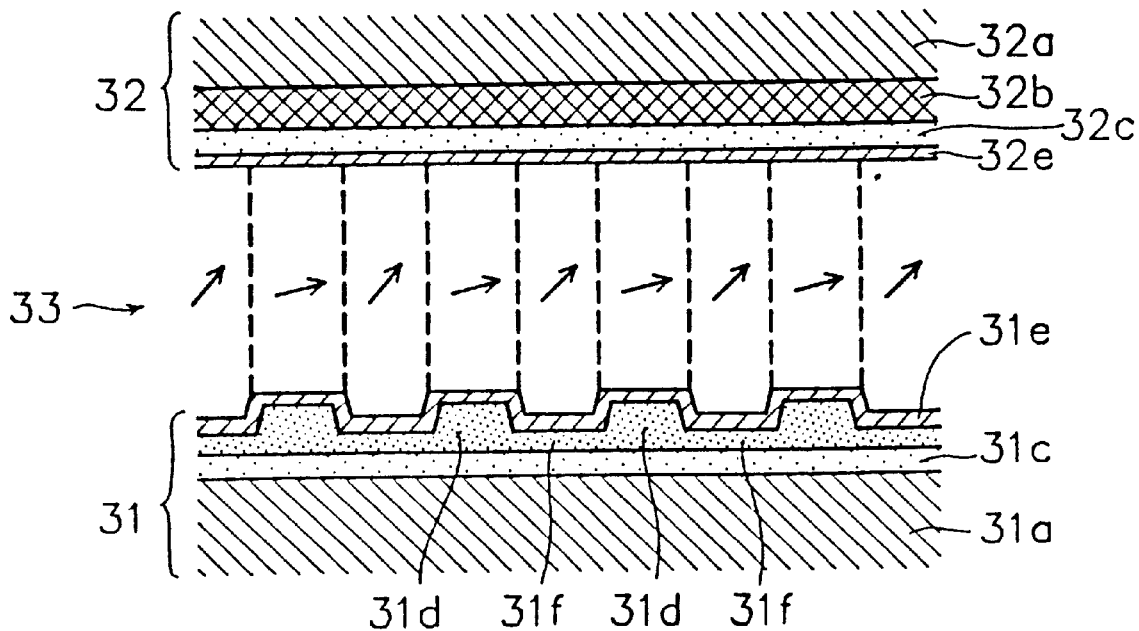
FIG. 14 is a cross-sectional view showing a portion of a liquid crystal display according to Example 6 of the present invention.

FIG. 14 is a cross-sectional view of a liquid crystal display according to this example. In this example, insulating film lines 31f are each formed in the portion corresponding to the spacing b in FIG. 11, the thickness of the insulating film lines 31f being smaller than that of the insulating lines 31d formed in the portions corresponding to the line width a. As a result, most of the substrate surface is covered with insulating films of different thicknesses. The insulating film lines 31d are formed in such a manner that an average direction of directions taken along the longitudinal length of each individual film line crosses substantially at right angles with an average direction of orienting directions of the liquid crystal molecules projected on the substrate 31a. The insulating film lines 31f also are formed in like manner.

In the structure of this example, though the entire surface of the substrate is substantially covered with insulating films, the insulating films lines 31f are formed thinner than the insulating films lines 31d; therefore, when a voltage is applied between the pixel electrode 31c and the transparent electrode 32c across the liquid crystal layer 33, the resulting electric field is stronger through the insulating film lines 31f than through the insulating film lines 31d. As a result, when a voltage is applied, the liquid crystal molecules above portions corresponding to the spacing b line up at a different angle (indicated by an arrow) than the angle (indicated by another arrow) at which the liquid crystal molecules above the portions corresponding to the line width a are caused to line up under the same condition. This serves to eliminate viewing angle dependence.

In this example, the insulating film lines 31f are made thinner than the insulating film lines 31d, but alternatively, the insulating film lines 31f may be made thicker than the insulating film lines 31d. The point here is that the insulating films should be formed with different thicknesses.

EXAMPLE 7

This example is concerned with a structure in which a third line-patterned insulating film of different material is formed between the insulating film lines.

Figure 15:
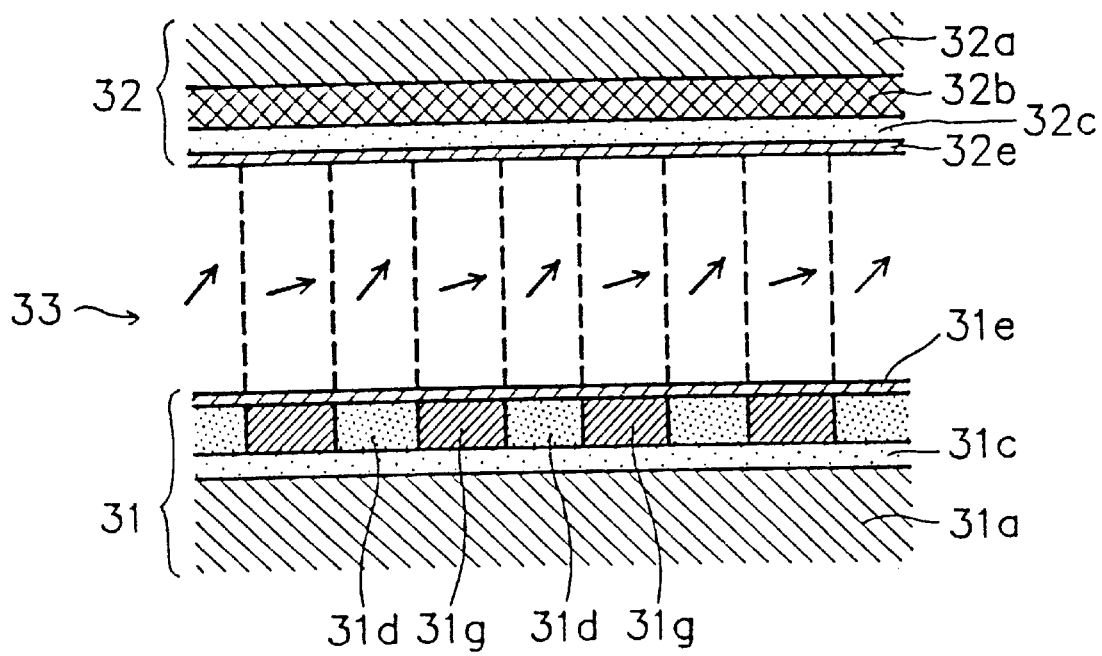
FIG. 15 is a cross-sectional view showing a portion of a liquid crystal display according to Example 7 of the present invention.

FIG. 15 is a cross-sectional view of a liquid crystal display according to this example. In this liquid crystal display, insulating film lines 31g are formed in the portions corresponding to the spacing b in FIG. 11, the material of the insulating film lines 31g being different from that of the insulating film lines 31d formed in the portions corresponding to the line width a. More specifically, silicon nitride and tantalum oxide having different relative permittivities, for example, are used for the insulating films 31g and 31d, respectively. The insulating film lines 31d are formed in such a manner that an average direction of directions taken along the longitudinal length of each individual film line crosses substantially at right angles with an average direction of orienting directions of the liquid crystal molecules projected on the substrate 31a. The insulating film lines 31g also are formed in like manner.

In the structure of this example, though the entire surface of the substrate is substantially covered with insulating films, the insulating film lines 31g have a higher relative permittivity than the insulating film lines 31d; therefore, when a voltage is applied between the pixel electrode 31c and the transparent electrode 32c across the liquid crystal layer 33, the resulting electric field is stronger through the insulating film lines 31g than through the insulating film lines 31d. As a result, when a voltage is applied, the liquid crystal molecules above the portions corresponding to the spacing b line up at a different angle (indicated by an arrow) than the angle (indicated by another arrow) at which the liquid crystal molecules above the portions corresponding to the line width a are caused to line up under the same condition. This serves to eliminate viewing angle dependence.

In this example, the insulating film lines 31g are formed to provide a higher relative permittivity than the insulating film lines 31d, but the present invention is not limited to this arrangement. Conversely, the insulating film lines 31g may be formed to provide a lower relative permittivity than the insulating film lines 31d, or other characteristic than relative permittivity may be used to differentiate one type of insulting film from the other. The point here is that the two types of insulating film should be formed so that different electric field strengths can be obtained.

Furthermore, in this example, one insulating film line 31g is formed between adjacent insulating film lines 31d, but alternatively, two or more insulating film lines 31g having different relative permittivity or other characteristic may be formed between them.

EXAMPLE 8

In this example, line-patterned insulating films are formed on both substrates disposed with the liquid crystal layer sandwiched between them, and the line pattern formed on one substrate is displaced widthwise from that formed on the other substrate.

Figure 16:
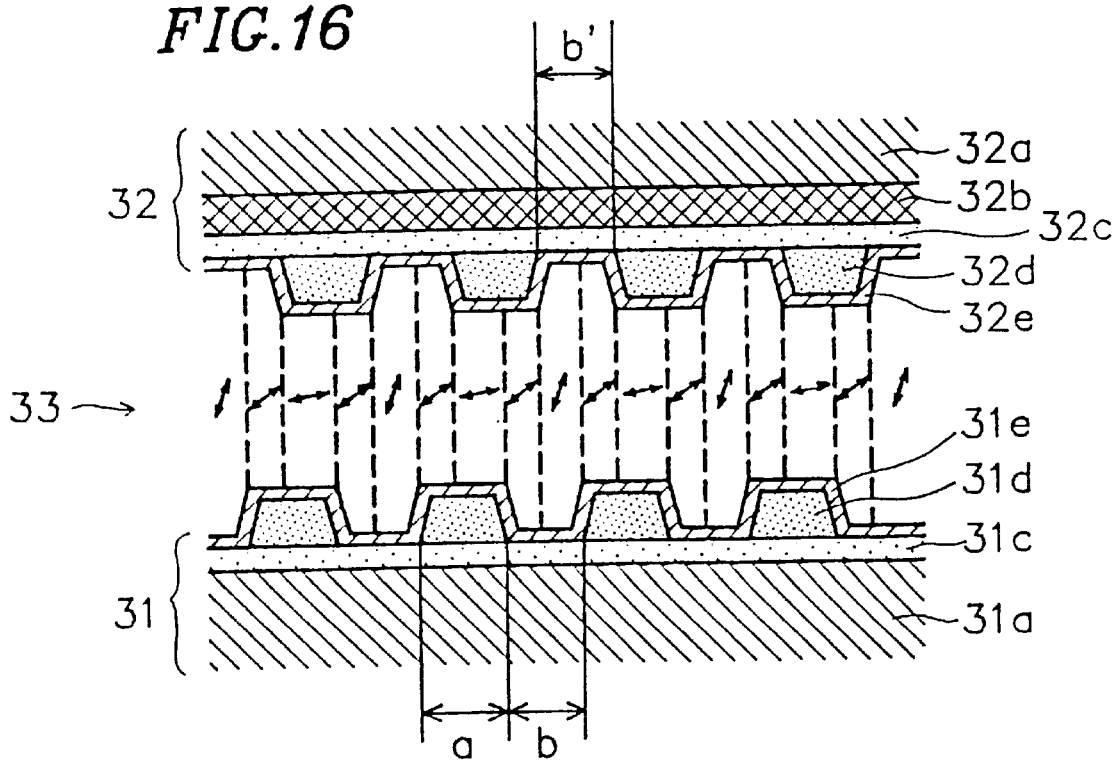
FIG. 16 is a cross-sectional view showing a portion of a liquid crystal display according to Example 8 of the present invention.

FIG. 16 is a cross-sectional view of a liquid crystal display according to this example. In this liquid crystal display, a line-patterned insulating film 31d is formed on the active matrix substrate 31, and a line-patterned insulating film 32d is formed on the counter substrate 32, the line-patterned insulating films 31d and 32d being displaced in position from each other in the width direction thereof. The line-patterned insulating films 31d and 32d are each formed in such a manner that an average direction of directions taken along the longitudinal length of each individual film line crosses substantially at right angles with an average direction of orienting directions of the liquid crystal molecules projected on the substrate 31a.

In the structure of this example, three different regions are formed: a region where the portion corresponding to the spacing b of the line-patterned insulating film 31d is opposite the portion corresponding to the spacing b' of the line-patterned insulating film 32d; a region where the portion corresponding to the spacing b or the spacing b' is opposite the insulating film line 31d or 32d; and a region where the insulating film line 31d is opposite the insulating film line 32d. This structure therefore offers the same effect as can be obtained when the line width or line spacing of the line-patterned insulating film 31d is reduced.

EXAMPLE 9

This example is concerned with a structure in which the insulating film lines are connected together at both ends thereof.

Figure 17:
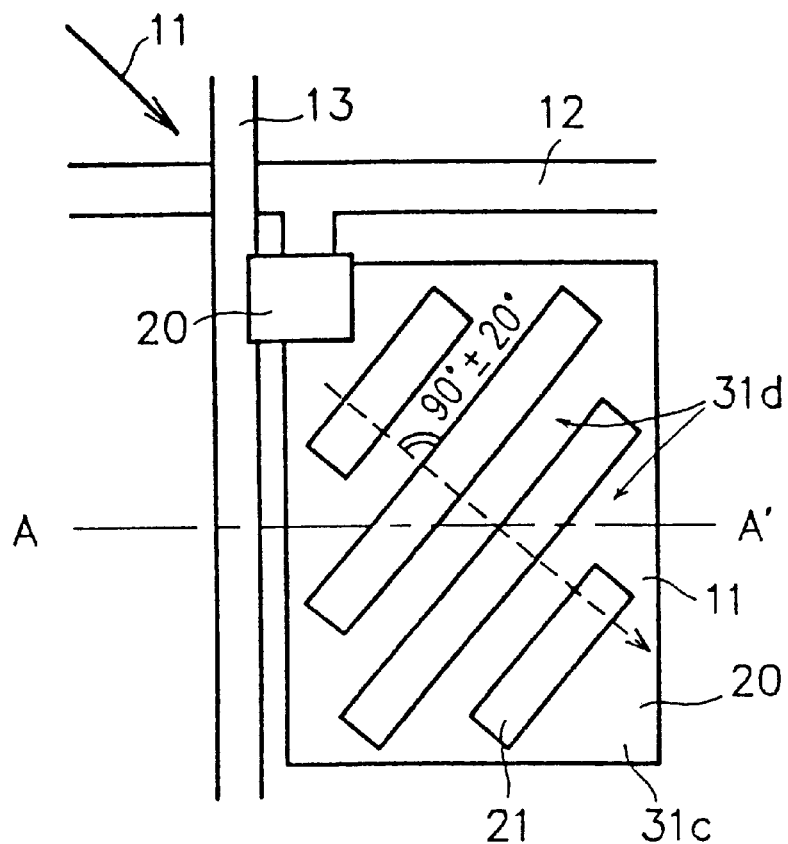
FIG. 17 is a plan view showing a portion of a liquid crystal display according to Example 9 of the present invention.
Figure 18:
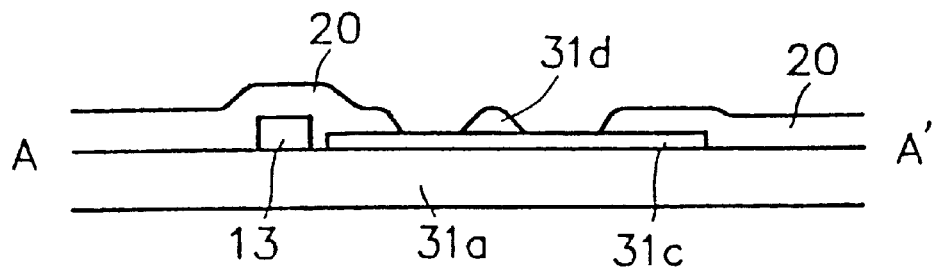
FIG. 18 is a cross-sectional view taken along line A-A' in FIG. 17.

FIG. 17 is a plan view of a liquid crystal display according to this example, and FIG. 18 is a cross-sectional view taken along line A-A' in FIG. 17. In FIGS. 17 and 18, the same parts as those shown in FIGS. 10 and 11 are designated by the same reference numerals. In this liquid crystal display, first an insulating film 20 is formed to cover most of the display area surface where the pixel electrodes 31c are formed in a matrix array on the active matrix substrate 31, and then, linelike openings 21 are etched into the insulating film 20 over selected regions of the pixel electrode 31c, which results in the formation of insulating film lines 31d. Adjacent insulating film lines 31d are connected together at both ends thereof.

In this structure, the regions where the line openings 21 are formed correspond to the spacing b shown in FIG. 11, and the insulating film regions where no line openings 21 are formed correspond to the line width a. The structure therefore provides a similar effect to that obtained in Example 3. Furthermore, since each insulating film line is formed in a tapered shape, a similar effect to that obtained in Example 5 can also be obtained. The insulating film lines 31d are formed in such a manner that the longitudinal direction thereof makes an angle 90°±20° with the rubbing direction indicated by an arrow 11.

In Example 9 also, the same modifications as described in Examples 4 to 8 can be made, in which case the same effects as mentioned in the respective examples can be obtained for the respective modifications.

In Example 9, adjacent insulating film lines 31d are connected together at both ends thereof, but the invention is not limited to the illustrated structure. In an alternative structure, each insulating film line 31d may be connected to an adjacent film line at one end thereof. In this case, the insulating film lines 31d may be connected together, with each connecting end positioned in alternating fashion or in a random order.

Figure 19:
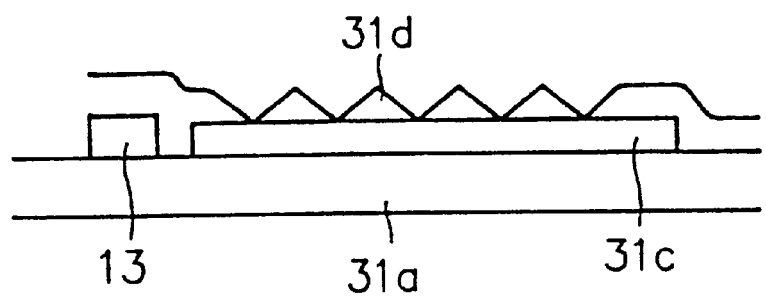
FIG. 19 is a cross-sectional view of the liquid crystal display of the present invention in which a line-patterned insulating film is formed with adjacent lines contacting each other.

In Examples 3, 4, 5, and 9, no insulating film is formed between adjacent insulating film lines 31d, but the invention is not limited to such a structure. For example, the insulating film lines 31d may be formed in a tapered shape in such a manner that adjacent insulating film lines contact with each other, as shown in FIG. 19. In such a structure also, a stronger electric field is formed across the thinner regions of the insulating film 31d than across the thicker regions thereof.

Figure 20:
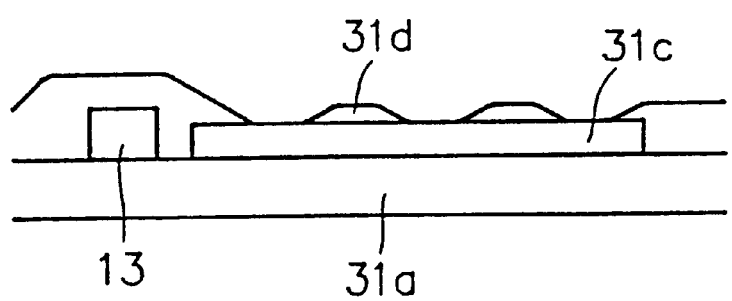
FIG. 20 is a cross-sectional view of the liquid crystal display of the present invention, showing a line-patterned insulating film in an alternative form wherein each film line is provided with tapered sides.
Figure 21:
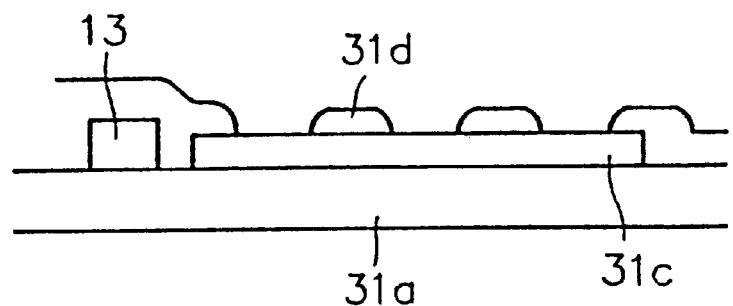
FIG. 21 is a cross-sectional view of the liquid crystal display of the present invention, showing a line-patterned insulating film in a further alternative form wherein each film line is provided with tapered sides.

In Examples 5 and 9, the taper-structured line-patterned insulating film 31d does not have a planar top, but it will be recognized that the insulating film 31d may be formed in such a manner that each film line has a planar top as shown in FIG. 20. Also, the taper structure of the insulating film line 31d includes a structure in which both sides of the top are rounded as shown in FIG. 21. In this rounded taper structure, the angle that the average slope of the tangents to each rounded portion makes with the substrate surface correspond to the taper angle. The taper angle should be set within the range of 1° to 45°.

In any of Examples 3 to 9, description has been given by taking an active matrix liquid crystal display as an example, but it will be appreciated that the invention is also applicable to other types of display structure where nonlinear electric elements are not formed on one substrate, that is, simple matrix liquid crystal displays.

As is apparent from the above explanation, according to the above aspect of the invention, an insulating film is patterned in a line pattern, or insulating films of different materials or different thicknesses are formed over the electrode in each pixel area. As a result, different regions with different electric field strengths and therefore different orientations can be formed within one pixel area. This structure prevents the inversion phenomenon occurring in the positive viewing direction and the contrast degradation occurring in the negative viewing direction, and thus improves the viewing angle dependence. Furthermore, since the inversion phenomenon of half-tone portions can be suppressed, this structure can also be applied to normally white mode liquid crystal displays which provide good contrast. Moreover, since the step of forming the line-patterned insulating film can be performed simultaneously with the patterning of the insulating protective film formed between the electrode and the liquid crystal layer, no extra fabrication steps are needed. The invention thus provides a low-cost, high-contrast, and high-quality liquid crystal display.

In a further aspect of the present invention, of the pair of wiring substrates disposed opposite each other, at least one substrate has one or more slit-like openings or low-permittivity insulating film lines formed in or on the electrode of each pixel. Such slit-like openings and low-permittivity insulating film lines are formed in such a manner that the longitudinal direction thereof is perpendicular to the average orienting direction of the liquid crystal molecules projected on the substrate; furthermore, each pixel region of the electrode formed on one substrate is made larger than the corresponding region of the electrode formed on the other substrate by an arbitrary value in directions substantially parallel to the average orienting direction of the liquid crystal molecules projected on the substrate. As a result, the electrode regions formed opposite each other are displaced from each other along two directions parallel to the average orienting direction of the liquid crystal molecules projected on the substrate, so that an obliquely acting electric field is formed between the electrodes. When the pretilt angle of the liquid crystal molecules is set at 0°, the liquid crystal molecules line up parallel to the obliquely acting electric field, and therefore, it is easy to control the molecular alignment.

Because of the physical displacement between the opposing electrode regions, different regions where the liquid crystal molecules are caused to line up differently can be formed within the same pixel. This structure greatly improves the viewing angle characteristic.

It is desirable that the width of the slit-like opening or low-permittivity insulating film line be made larger than the spacing between the pair of wiring substrate, since a smaller width would make the application of an oblique electric field to the liquid crystal molecules difficult.

The step of forming the slit-like openings and the step of forming the above-mentioned region of the electrode on the one substrate larger than the corresponding region of the electrode on the other substrate can be performed simultaneously with the usual electrode patterning steps. Also, the step of forming the low-permittivity insulating film lines can be performed simultaneously with the step of forming the insulating protective film formed to prevent shorting between the wiring substrate. Subsequent formation and rubbing processing of the organic alignment films can be performed using a conventional processing step. Therefore, no extra processing steps are needed, and there is no possibility of contaminating the organic alignment films.

Examples according to the above aspect of the invention will be described in detail below with reference to relevant drawings.

EXAMPLE 10

Figure 22:
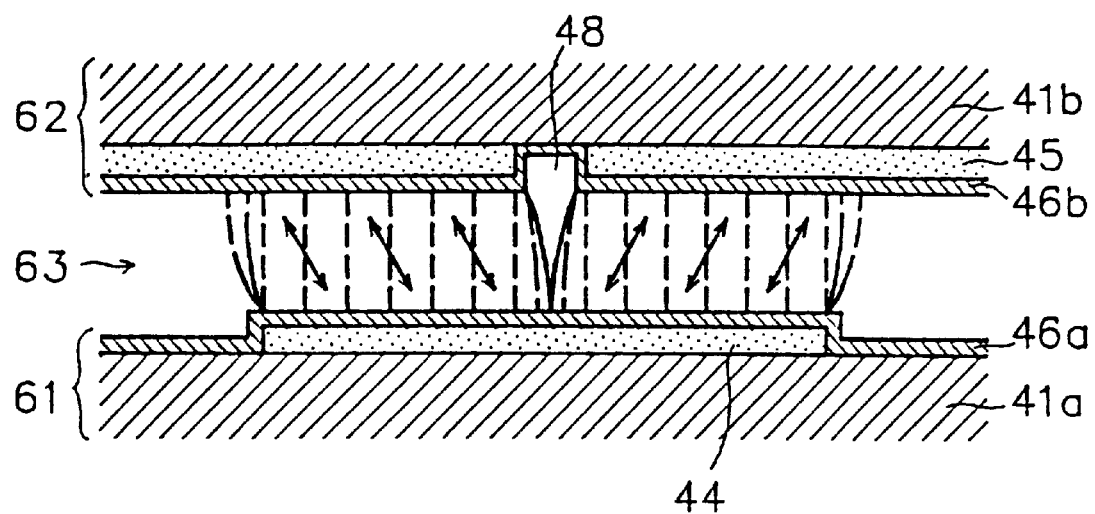
FIG. 22 is a cross-sectional view of an active matrix liquid crystal display according to Example 10 of the present invention.

FIG. 22 shows a cross-sectional view of a TN active matrix liquid crystal display according to Example 10. In this liquid crystal display, wiring substrates 61 and 62 with a plurality of electrode conductors formed thereon are disposed opposite each other with a liquid crystal layer 63 sealed between them.

Figure 23:
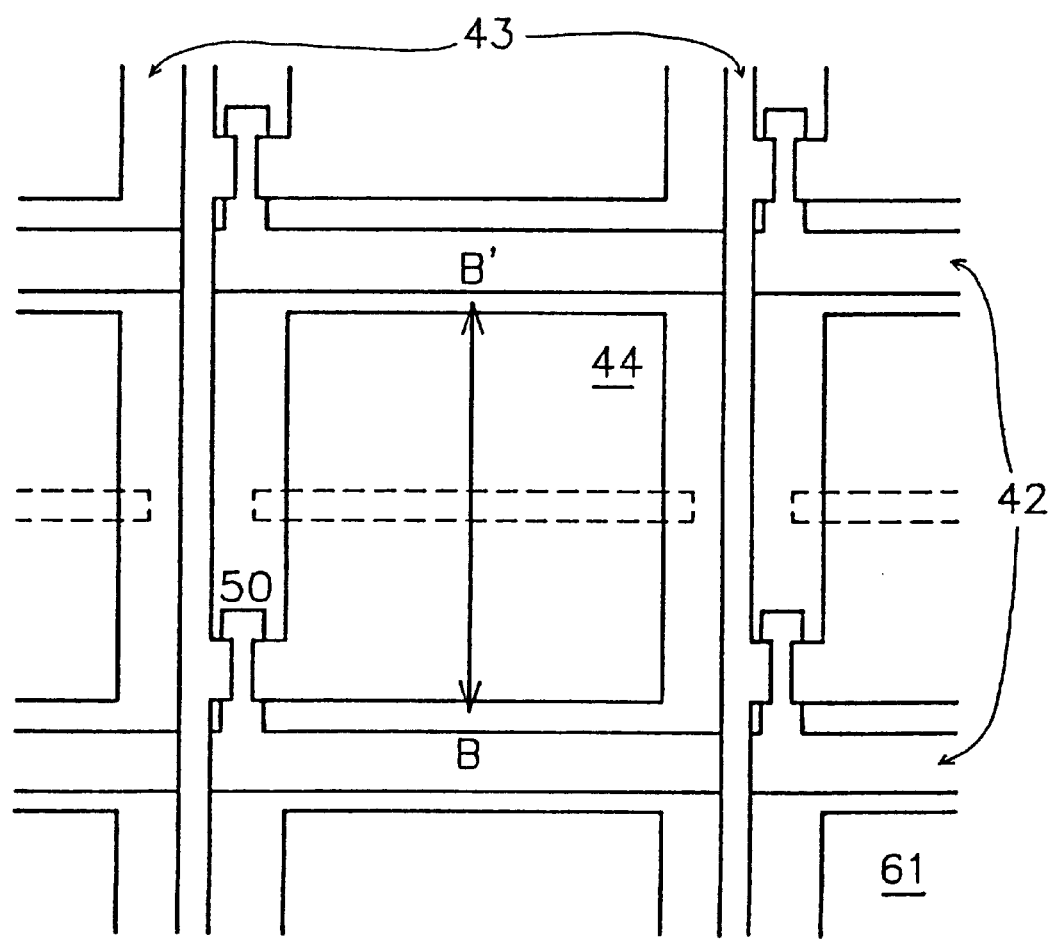
FIG. 23 is a plan view of the liquid crystal display of FIG. 22.

FIG. 23 shows a plan view of the wiring substrate 61. The wiring substrate 61 includes an insulating substrate 41a formed from glass or like material, and scanning lines 42 and signal lines 43 formed thereon intersecting with each other. A pixel electrode 44 is formed in each region surrounded by the scanning lines 42 and signal lines 43. In one corner of each of the regions is formed a switching device 50 which is electrically connected to the pixel electrode 44 and also to one scanning line 42 and one signal line 43 adjacent to the pixel electrode 44. A device of any desired structure can be used as the switching device 50. In this example, an amorphous silicon thin-film transistor (hereinafter called the TFT) 50 is used.

On the other wiring substrate 62, there are formed a light blocking film (not shown) for blocking light to other regions than the pixel region, and a counter electrode 45.

In the counter electrode 45, there is formed, as shown by dotted lines in FIG. 23, a slit-like opening 48 extending perpendicular to the average orientating direction of the liquid crystal molecules projected on the substrate. The average orienting direction here refers to the direction in which the liquid crystal molecule in the center of the liquid crystal layer 63 is oriented. As shown in FIG. 22, each square region of the counter electrode 45, which forms one pixel region, is made larger than the corresponding region of the pixel electrode 44 along directions parallel to the average orienting direction of the liquid crystal molecules projected on the substrate. In this example, the width of the slit-like opening 48 is chosen to be about 10 $\mu$m. It is desirable that this width be made larger than the spacing (about 5 $\mu$m) between the wiring substrates 61 and 62, since a smaller width would make the application of oblique electric field components to the liquid crystal molecules difficult. The slit-like opening 48 is formed at the same time when the counter electrode 45 is patterned.

Furthermore, alignment films 46a and 46b for controlling the orientation of the liquid crystal molecules are formed on the wiring substrates 61 and 62, respectively. The alignment films 46a and 46b, each formed from an organic material, are subjected to rubbing processing. The wiring substrates 61 and 62 are then bonded together, and liquid crystal material is sealed in between the two substrates 61 and 62 (liquid crystal cell), to form the liquid crystal layer 63. The pretilt angle of the liquid crystal molecules is 0°. The ends (not shown) of the substrates 61 and 62 are sealed with a resin or the like, and peripheral circuits (not shown), etc. are mounted to complete the liquid crystal display.

Figure 24:
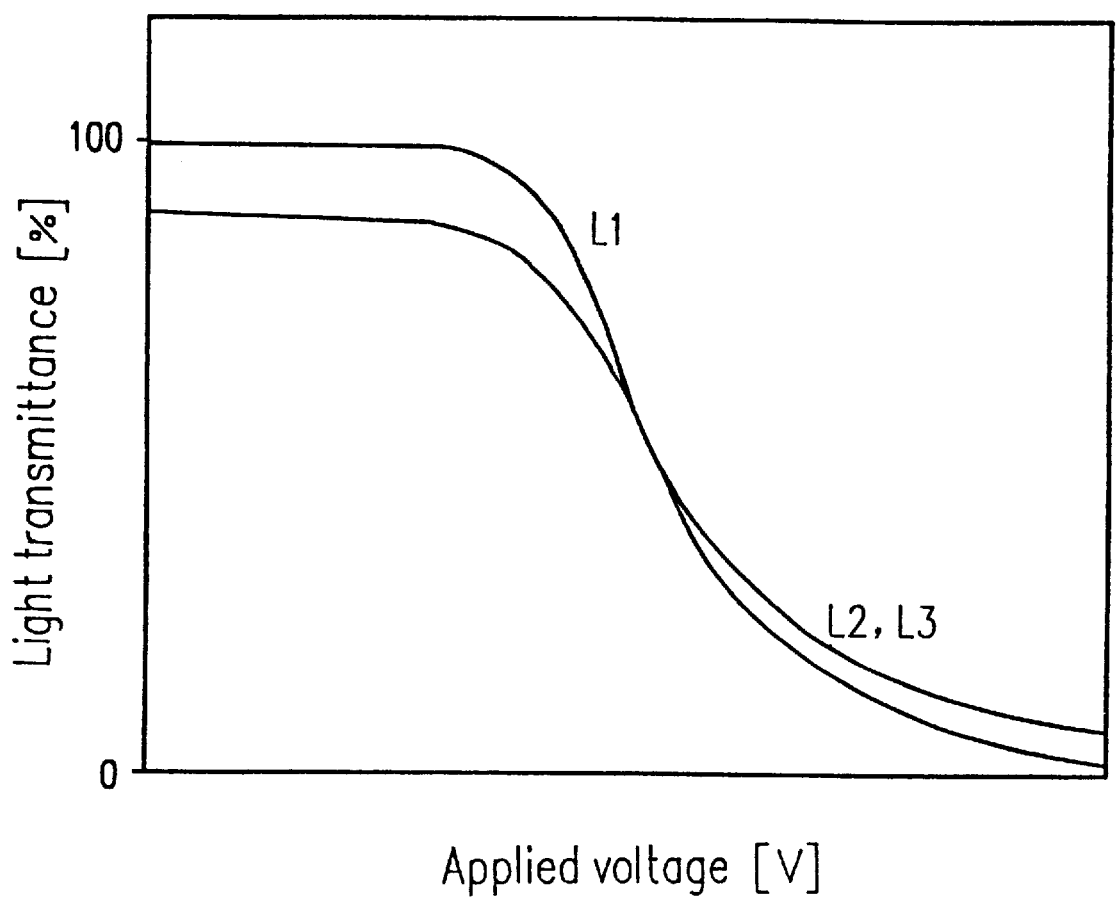
FIG. 24 is a graph showing the applied voltage - transmittance characteristics (V-T characteristics) of the liquid crystal display of Example 10 of the present invention.

In this liquid crystal display, since the slit-like opening 48 is formed in the counter ecteode 45, an oblique electric field is formed between the pixel electrode 44 and the counter electrode 45, as shown in FIG. 22, so that the liquid crystal molecules can be aligned in the directions shown by the arrows. Thus, within the same pixel region, different regions are formed where the liquid crystal molecules are caused to line up in opposite directions; as a result, the V-T characteristics shown in FIG. 24 can be obtained and the viewing angle characteristic of the liquid crystal display can be improved.

In Example 10, the slit-like opening 48 is formed in the counter electrode 45. Alternatively, as sown in FIG. 25, slit-like openings 48 (shown by solid lines in FIG. 25) may be formed in the pixel electrode 44 on the wiring substrate 61 and slit-like openings 48 (shown by dotted lines in FIG. 25) in the counter electrode 45 on the wiring substrate 62 in such a manner that the slit-like openings on one substrate are positioned alternately between the slit-like openings on the other substrate along a direction parallel to the average orienting direction of the liquid crystal molecules projected on the substrate. Further, as shown in FIG. 26, slit-like openings 48 (shown by dotted lines in FIG. 26) may be formed in the counter electrode 45 in such a manner that each opening partially, for example, half faces an edge portion of the pixel electrode 44 on the wiring substrate 61. On the other hand, when the slit-like openings 48 are formed in the pixel electrode 44, one end of each slit-like opening may be open, in which case the pixel electrode 44 is formed in a comb-like or bellows-like shape.

Since the slit-like openings 48 may result in the formation of disclination lines due to disturbed orientation of the liquid crystal molecules, a light blocking film may be formed over the openings to conceal such lines. Such light blocking film can be formed at the same time when a light blocking film material is applied and patterned on the wiring substrate 62. The light blocking film can also be formed at the same time when an opaque film, such as a titanium, tantalum, or aluminum film, for forming the switching device 50 is patterned on the wiring substrate 61, or when the scanning lines 42 are patterned using a wiring material. In the case of the slit-like openings 48 shown in FIG. 26 also, disclination lines formed at the boundaries between the different regions where the liquid crystal molecules line up differently can be concealed by forming light blocking film in the same manner as described above.

Figure 25:
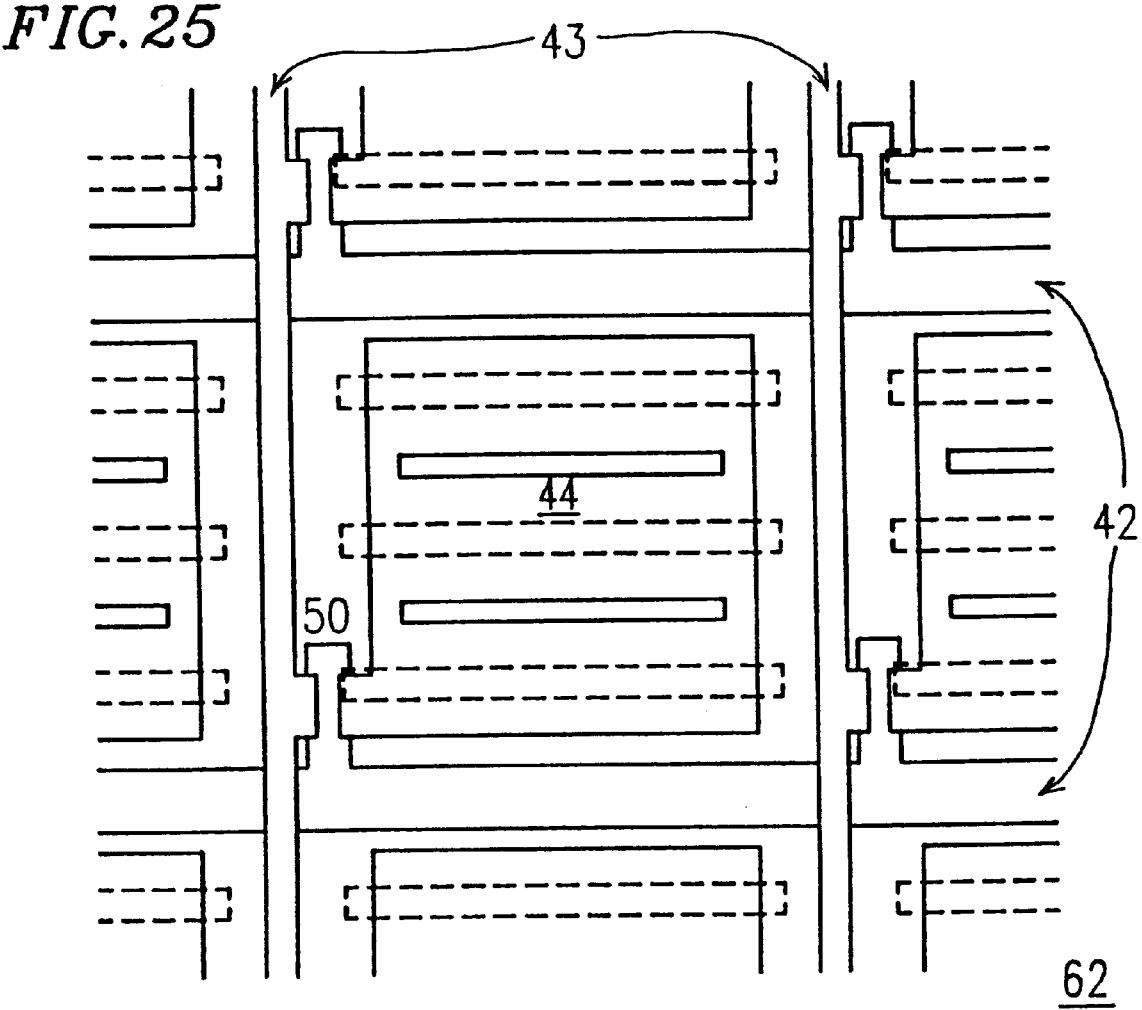
FIG. 25 is a plan view of a liquid crystal display according to another example of the present invention.
Figure 26:
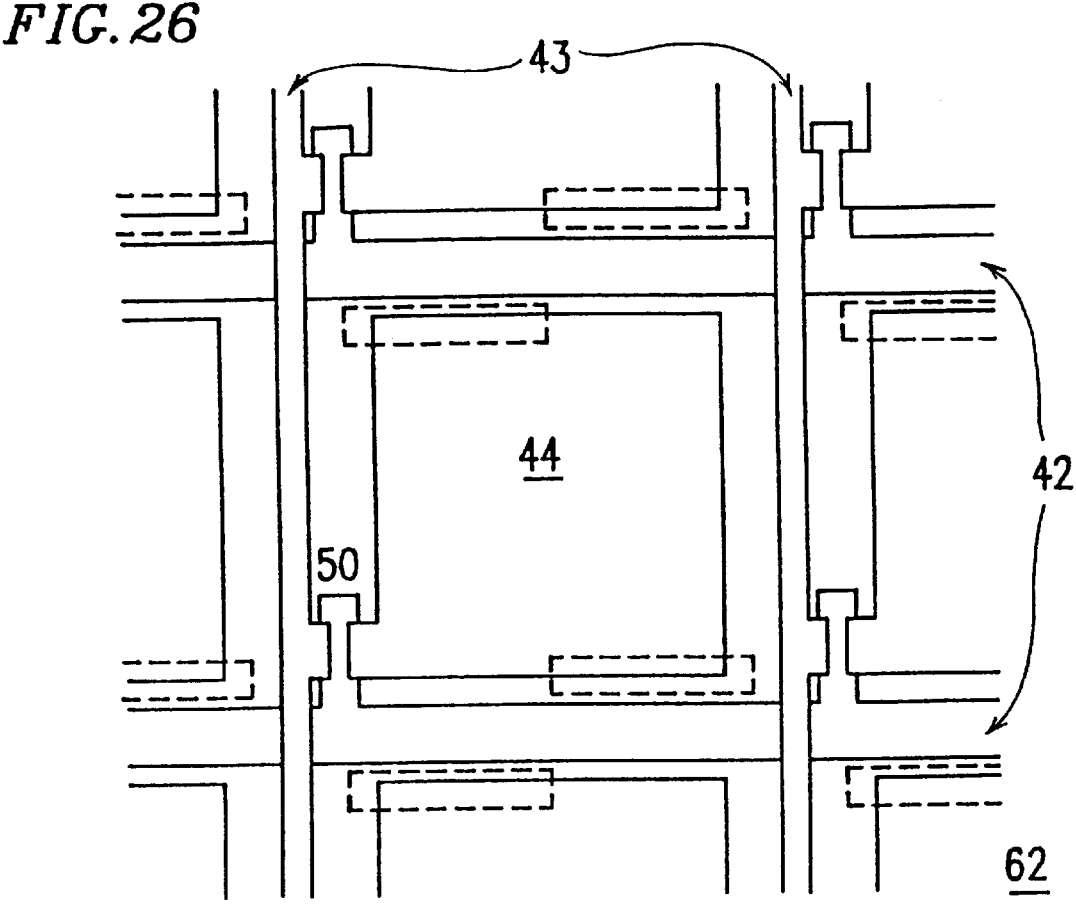
FIG. 26 is a plan view of a liquid crystal display according to another example of the present invention.

Any of the slit-like openings 48 shown in FIGS. 23, 25, and 26 can provide similar effects. The more regions each pixel is divided into, the more natural the effect looks to the eye of the observer, but this in turn reduces the ratio of aperture of the liquid crystal display. Therefore, it is desirable that the pixel be divided into an optimum number of regions according to the size of the pixel. For example, when the pixel size is about 70 $\mu$m×230 $\mu$m, it is desirable that the pixel be divided into two to four regions.

In Example 10, an insulating protective film (not shown) may be formed on the pixel electrode 44 or the counter electrode 45 or on both, to prevent shorting between the wiring substrates 61 and 62. This insulating protective film should preferably be formed with a window opened in at least one portion thereof to prevent the dc component of the electric field from being applied to the liquid crystal molecules in the pixel. With respect to the window-opened structure, Japanese Laid-open Patent Publication No. 2-171721 and U.S. Pat. No. 5,066,110 are referred to in this application. Furthermore, color filters (not shown) may be provided on the wiring substrate 62 to achieve a color display.

EXAMPLE 11

Figure 27:
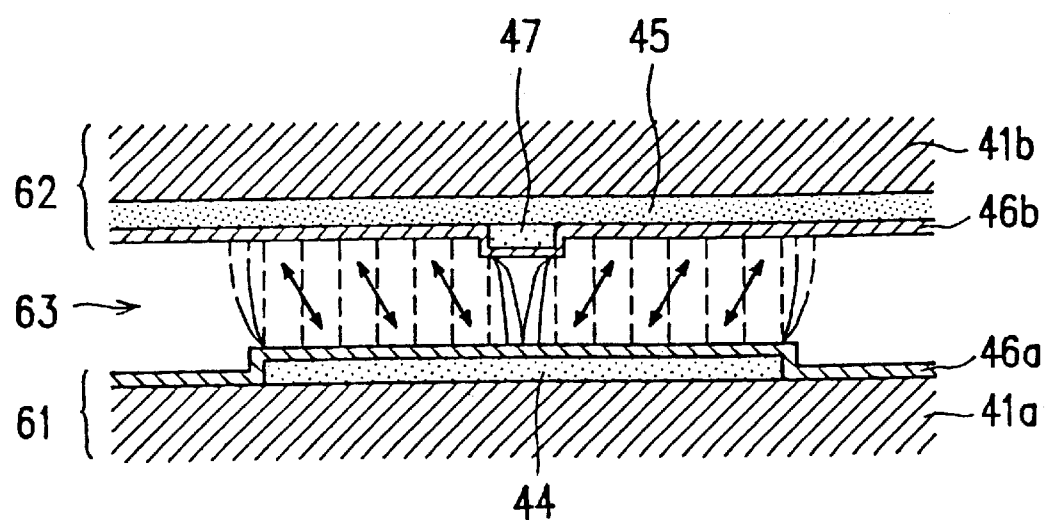
FIG. 27 is a cross-sectional view of a liquid crystal display according to Example 11 of the present invention.

FIG. 27 shows a cross-sectional view of a liquid crystal display according to Example 11. In this liquid crystal display, there is formed, in a convenient position between the counter electrode 45 and the liquid crystal layer 63, a low-permittivity insulating film 47, as shown by dotted lines in FIG. 23, which extends in a direction perpendicular to the average orienting direction of the liquid crystal molecules projected on the substrate. As shown in FIG. 27, the square region of the counter electrode 45 that forms one pixel is made larger than the pixel electrode 44 in directions parallel to the average orienting direction of the liquid crystal molecules projected on the substrate. It is desirable that the width of this insulating film 47 be made larger than the spacing (about 5 $\mu$m) between the substrates, since a smaller width would make the application of oblique electric field components to the liquid crystal molecules difficult. The insulating film 47 is made of silicon oxide or silicon nitride and formed simultaneously with an insulating protective film (not shown) formed to prevent shorting between the wiring substrates 61 and 62. In other respects, the construction can be made identical to that of Example 10.

In this liquid crystal display, the low-permittivity insulating film formed between the counter electrode 45 and the liquid crystal layer 63 serves to weaken the electric field applied to the liquid crystal layer 63 in that portion. As a result, as in Example 10, an oblique electric field is formed between the electrodes, and the aligning direction of the liquid crystal molecules can be controlled as shown by the arrows. Since the liquid crystal molecules can be caused to line up in opposite directions within one pixel, as in Example 10, the viewing angle characteristic of the liquid crystal display can be improved.

Figure 28:
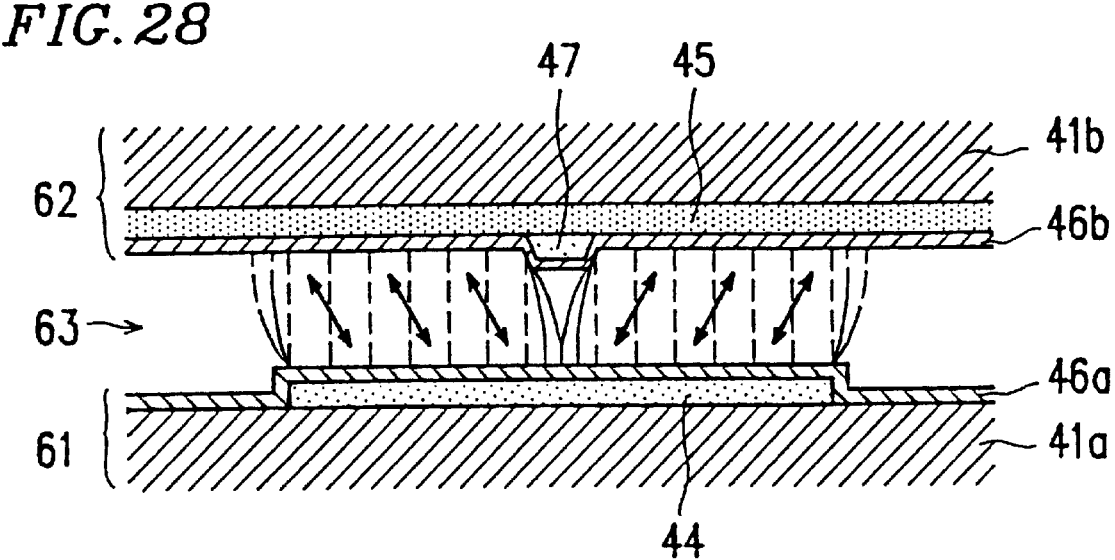
FIG. 28 is a cross-sectional view of a liquid crystal display according to another example of the present invention.

In Example 11, the low-permittivity insulating film 47 is formed between the counter electrode 45 and the liquid crystal layer 63, but this may be formed between the pixel electrode 44 and the liquid crystal layer 63 (as shown by solid lines in FIG. 25) as well as between the counter electrode 45 and the liquid crystal layer 63 (as shown by dotted lines in FIG. 25) in such a manner that one alternates with another, as shown in FIG. 26, along a direction parallel to the average orienting direction of the liquid crystal molecules projected on the substrate. Alternatively, insulating film lines 47 (shown by dotted lines in FIG. 26) formed between the counter electrode 45 and the liquid crystal layer 63 may be arranged so that each film line partially, for example, half faces an edge portion of the pixel electrode 44 on the wiring substrate 61. Furthermore, the insulating film 47 may be formed continuously across two or more pixels instead of being formed like a separate island in each pixel. Moreover, if the insulating film is formed with tapered edges as shown in FIG. 28, the aligning direction of the liquid crystal molecules can be further stabilized.

As in Example 10, a light blocking film may be formed over the low-permittivity insulating film 47 to conceal the disclination lines resulting from disturbed orientation of the liquid crystal molecules.

Any of the variation of the low-permittivity insulating film 47 shown in FIGS. 23, 25, and 26 can provide similar effects. The more regions each pixel is divided into, the more natural the effect looks to the eye of the observer, but this in turn reduces the ratio of aperture of the liquid crystal display. Therefore, it is desirable that the pixel be divided into an optimum number of regions according to the size of the pixel. For example, when the pixel size is about 70 μm×230 μm, it is desirable that the pixel be divided into two to four regions.

Furthermore, color filters (not shown) may be provided on the wiring substrate 62 to achieve a color display.

The liquid crystal display of the present invention may be provided with both the slit-like openings 48 shown in Example 10 and the low-permittivity insulating film 47 shown in Example 11 in or on each electrode on at least one of the substrates.

Figure 29:
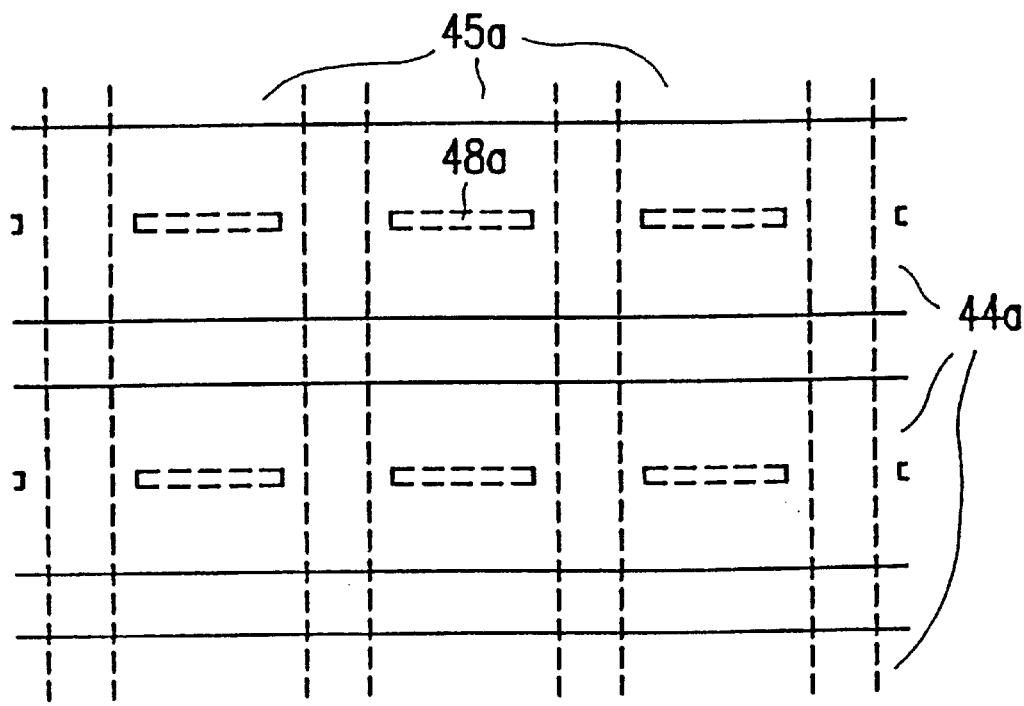
FIG. 29 is a plan view of a liquid crystal display according to another example of the present invention.
Figure 30:
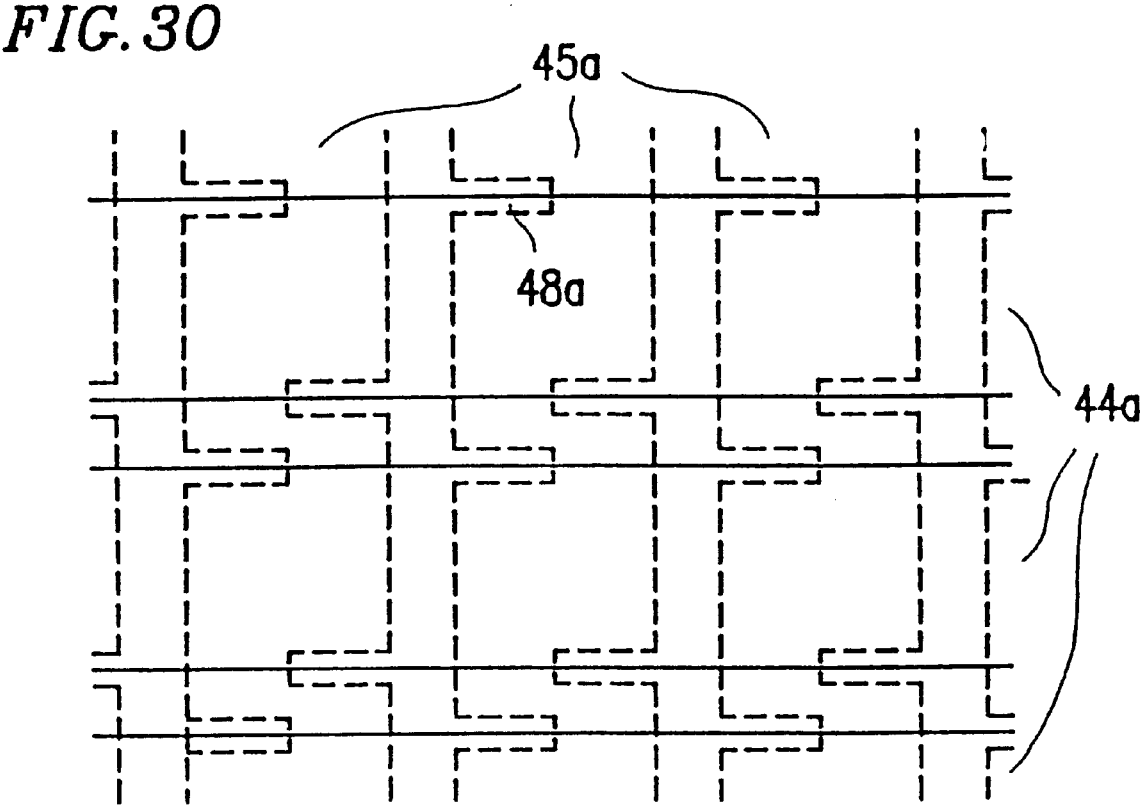
FIG. 30 is a plan view of a liquid crystal display according to another example of the present invention.

In Examples 10 and 11, the invention is applied to an active matrix-driven liquid crystal display, but it will be appreciated that the invention is also applicable to a duty-driven liquid crystal display. In the latter case, a slit-like opening 48a may be formed in the pixel 45a formed on one wiring substrate 62, as shown in FIGS. 29 and 30, wherein the electrodes 44a formed on the wiring substrate 61 are indicated by solid lines and the electrodes 45a formed on the wiring substrate 62 are shown by dotted lines. In the liquid crystal displays shown in FIGS. 29 and 30, instead of the slit-like openings 48a a low-permittivity insulating film may be formed in a similar pattern.

As is apparent from the above description, according to the invention, since the liquid crystal molecules in the display can be easily controlled so that they line up in different directions, more than one viewing directions can be built into each pixel. This structure serves to reduce the viewing angle dependence of the liquid crystal display.

The step of forming the slit-like opening in the pixel and the step of forming the low-permittivity insulating film between the pixel and the liquid crystal layer can be performed simultaneously with the usual pixel patterning step and protective insulating film forming step, respectively. This achieves low-cost production of liquid crystal displays having good display quality and high reliability.

In a still further aspect of the present invention, of a pair of electrodes provided on the pair of opposing wiring substrates to form a pixel, at least one electrode is formed in a comb-like shape or with one or more open slits. In this structure, an obliquely acting electric field is formed in regions where no electrode is formed, and a force having components acting parallel to the substrate is exerted on the liquid crystal molecules. Furthermore, since the electrode is formed in such a manner that the teeth of the comb or the longitudinal sides of the slits extend substantially parallel to the average orienting direction of the liquid crystal molecules, the liquid crystal molecules are caused to line up in opposite directions on both outward sides of each tooth or on both inward side of each slit.

Since the liquid crystal molecules are thus caused to line up in different directions within each pixel, the inversion phenomenon that occurs in the positive viewing direction can be suppressed. In the negative viewing direction also, since the liquid crystal molecules partially stand up by the force having components acting parallel to the substrate,, the refractive index of the liquid crystal molecules is caused to change and the contrast can be improved.

Furthermore, if the teeth spacing or the slit width is made larger than the spacing between the two substrates, a situation that would occur with a narrower spacing or width can be prevented where oblique components of the electric field are difficult to be applied to the liquid crystal molecules.

The step of forming each pixel in a comb-like shape or with a slit or slits can be performed simultaneously with the usual pixel patterning step without affecting the subsequent steps and without requiring extra steps.

An example according to the above mode of the invention will be described in detail below with reference to relevant drawings.

EXAMPLE 12

Figure 31:
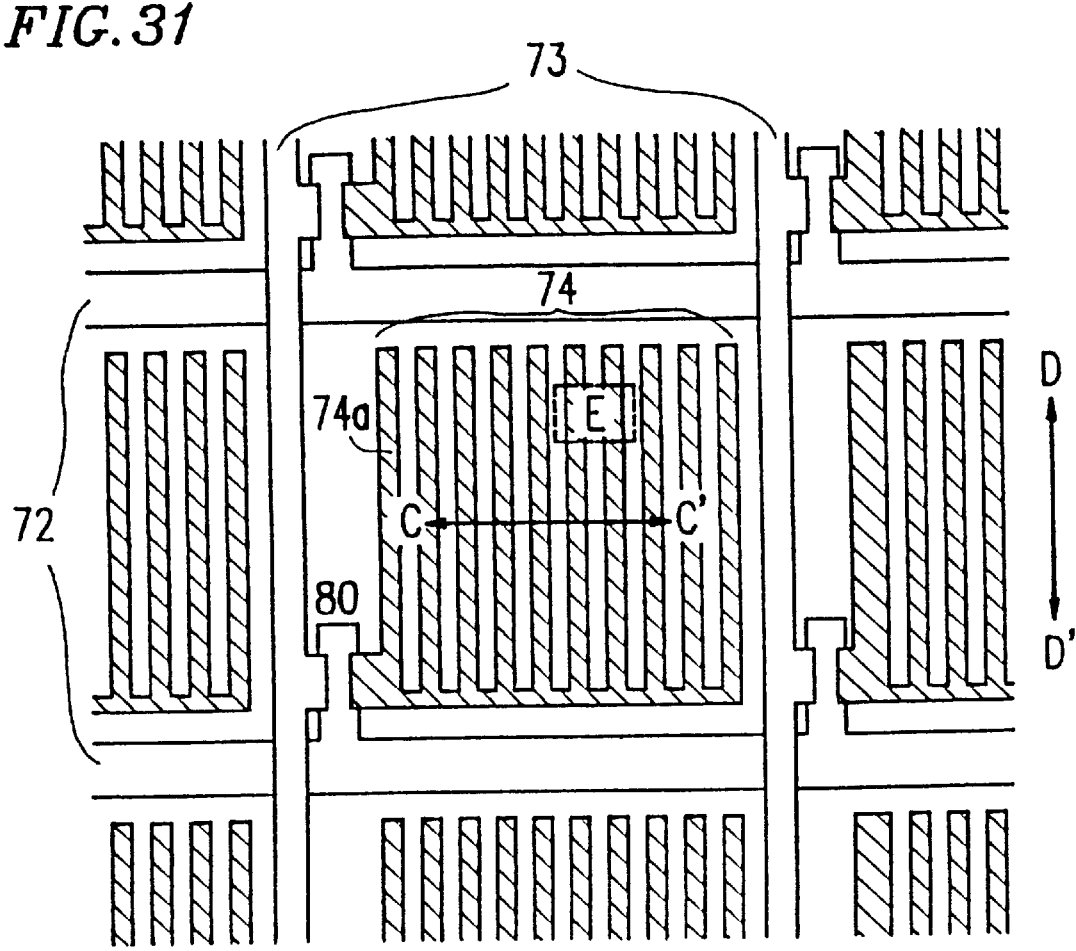
FIG. 31 is a plan view of a TN active matrix liquid crystal display according to Example 12 of the present invention.
Figure 32:
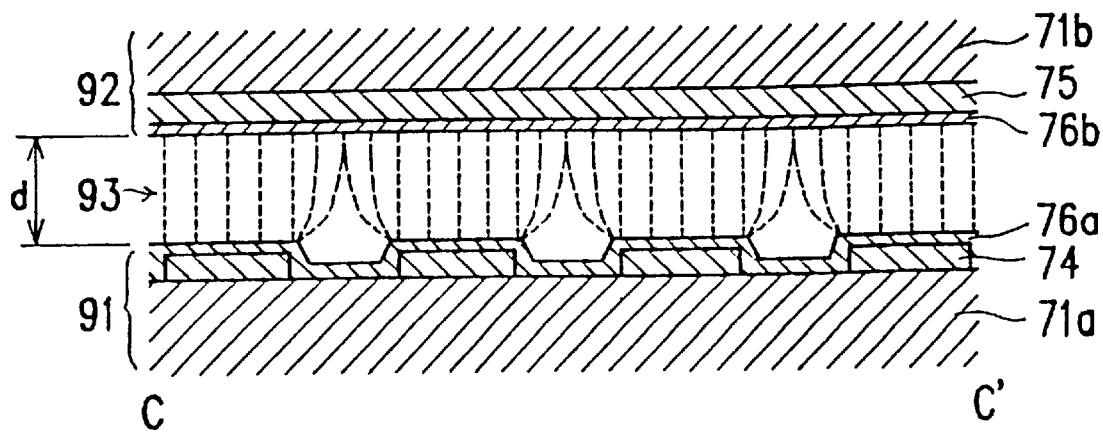
FIG. 32 is a cross-sectional view taken along line C-C' in FIG. 31.

FIG. 31 is a plan view of a TN active matrix liquid crystal display embodying the present invention. FIG. 32 is a cross-sectional view taken along line C-C' in FIG. 31. In this liquid crystal display, a liquid crystal layer 93 is sealed between wiring substrates 91 and 92 disposed opposite each other. The wiring substrate 91 includes an insulating substrate 71a made of glass or like material, on which scanning lines 72 and signal lines 73 are formed intersecting with each other. A pixel electrode 74 is formed in each region surrounded by the scanning lines 72 and signal lines 73. A switching device 80 is formed in one corner of each pixel region, and is electrically connected to the associated pixel electrode 74 and also to the scanning line 72 and signal line 73 adjacent to the pixel electrode 74. A device of any desired structure can be used as the switching device 80. In this example, an amorphous silicon thin-film transistor (hereinafter called the TFT) 80 is used. The pixel electrode 74 is formed in a comb-like shape as shown in FIG. 31, with the teeth 74a of the comb extending parallel to the average orienting direction (line D-D') of the liquid crystal molecules projected on the liquid crystal molecules.

On the other wiring substrate 92, a light blocking film (not shown) for blocking light to other regions than the pixel region, and a counter electrode 75 are formed in this order from the side of the substrate 92.

Furthermore, alignment films 76a and 76b for controlling the orientation of the liquid crystal molecules are formed on the wiring substrates 91 and 92, respectively, and are subjected to rubbing processing. The wiring substrates 91 and 92 are then bonded together with the alignment films 76a and 76b facing inside, and liquid crystals are sealed between the two substrates 91 and 92, to form the liquid crystal layer 93. The edges (not shown) of the substrates 91 and 92 are sealed with a resin or the like, and peripheral circuits (not shown), etc. are mounted.

Figure 33:
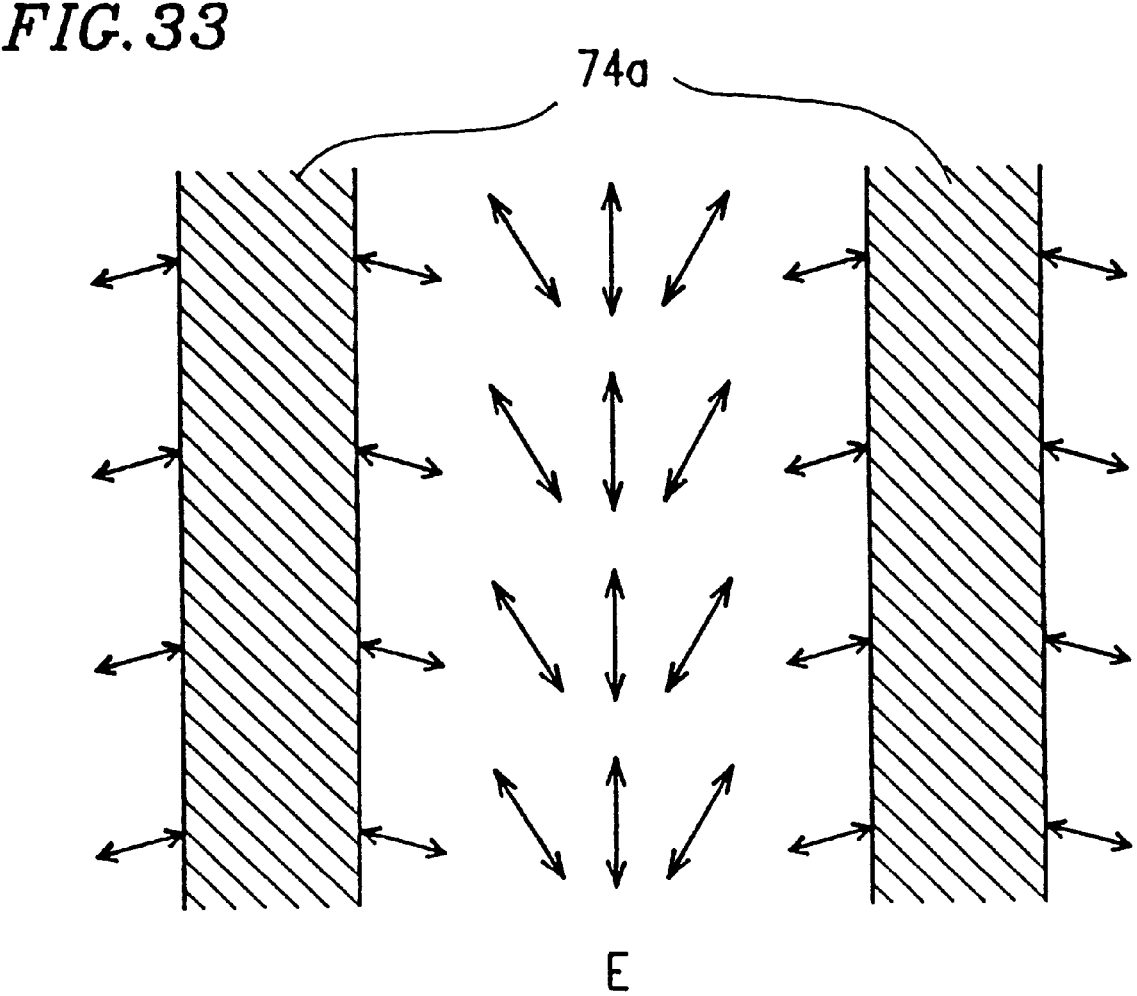
FIG. 33 is an enlarged view of portion E in FIG. 31.

In this liquid crystal display, since the pixel electrode 74 is formed in a comb-like shape, as described above, an obliquely acting electric field (electric lines of force are indicated by dotted lines) is formed in regions on both outward sides of each tooth 74a and between the pixel electrode 74 and the counter electrode 75, and a force having components parallel to the substrate is exerted on the liquid crystal molecules. Furthermore, since the teeth 74a are formed extending parallel to the average orienting direction of the liquid crystal molecules projected on the substrate, the liquid crystal molecules are caused to line up in directions toward the electrode in such a manner as to respond to the change of the electric lines of force, as shown in FIG. 33 (an enlarged view of portion E in FIG. 31), the molecular alignment thus being changed in opposite directions on both outward sides of each tooth 74a. This results in the formation of different regions within the same pixel where the liquid crystal molecules are caused to line up in opposite directions; consequently, the inversion phenomenon that occurs in the positive viewing direction can be suppressed, as shown by solid line L2 in FIG. 34. The teeth 74a need not necessarily be oriented exactly in parallel to the average orienting direction of the liquid crystal molecules projected on the substrate, but may be displaced somewhat from the parallel direction.

Figure 34:
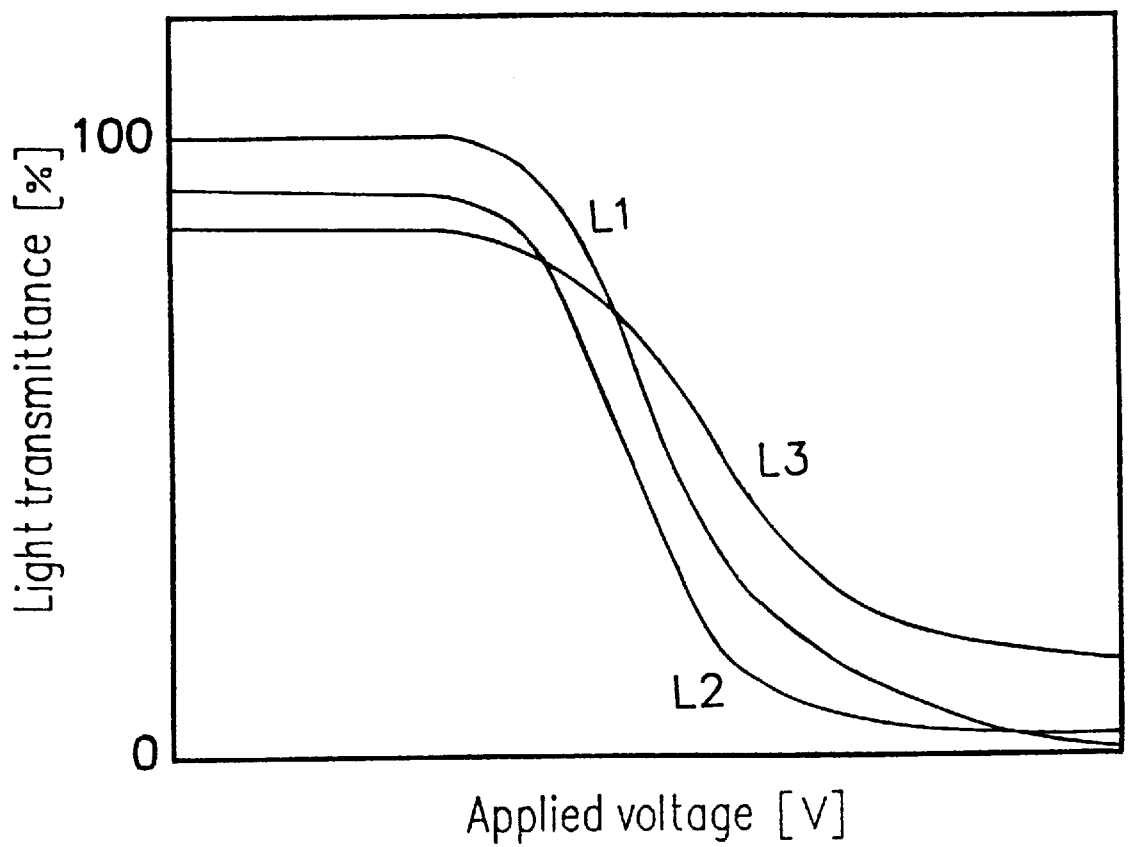
FIG. 34 is a graph showing the applied voltage - transmittance characteristics (V-T characteristics) of the liquid crystal display of Example 12 of the present invention.

In the negative viewing direction, on the other hand, since the liquid crystal molecules partially stand up by the force having components acting parallel to the substrate, the refractive index of the liquid crystal molecules is caused to change as shown by solid line L3 in FIG. 34, providing an improvement in contrast.

The teeth 74a can be formed with a desired width and in any number, the width and number being chosen appropriately according to the liquid crystal display. However, since an excessively narrow spacing between adjacent teeth 74a would make the application of oblique electric field components to the liquid crystal molecules difficult, it is desirable that the spacing between adjacent teeth 74a be made larger than the spacing (thickness of the liquid crystal layer 93) d between the wiring substrates 91 and 92. In this example, since the spacing d is about 5 μm, the width of each tooth 74a is set at 10 μm and the spacing between adjacent teeth 74a also at 10 μm.

In the above example, the pixel electrode 74 is formed in a comb-like shape, but the invention is not limited to this structure. Instead, one or more open slits may be formed in the pixel electrode 74. In this case, it is desirable that each slit be formed with its longitudinal side extending substantially parallel to the average orienting direction of the liquid crystal molecules projected on the substrate, so that the molecular alignment is changed in opposite directions on both inward sides of each slit, thus forming different regions within the same pixel where the liquid crystal molecules are caused to line up in opposite directions. This structure provides the same effect as obtained when the pixel electrode 74 is formed in a comb-like shape. Far the same reason as described above, it is desirable that the slit width be made larger than the spacing (thickness of the liquid crystal layer 93) d between the wiring substrates 91 and 92.

In the above example, the pixel electrode 74 is formed in a comb-like shape or with one or more slits, but the present invention is not limited to forming the pixel electrode 74 in such structure. Instead, the counter electrode 75 may be formed in such structure.

The step of forming each pixel in a comb-like shape or with a slit-like opening, as described above, can be performed simultaneously with the usual pixel patterning step. Accordingly, liquid crystal displays having good display quality and high reliability can be produced at low cost.

Furthermore, in the above example, an insulating protective film (not shown) may be formed on the pixel electrode 74 or the counter electrode 75 or on both, to prevent shorting between the wiring substrates 91 and 92. This insulating protective film should preferably be formed with a window opened in at least one portion thereof to prevent the dc component of the electric field from being applied to the liquid crystal molecules in the pixel. Furthermore, color filters (not shown) may be provided on the wiring substrate 92 to achieve a color display.

In the above example, the invention is applied to a TN active matrix liquid crystal display, but the invention is not limited to this application but can be applied to liquid crystal displays of other modes. Furthermore, the invention is not limited to active matrix-driven displays but can also be applied to duty-driven liquid crystal displays, etc.

As is apparent from the above description, according to the present invention, since liquid crystal molecules can be caused to line up in different directions within the same pixel, the inversion phenomenon that occurs in the positive viewing direction can be suppressed. Furthermore, since the liquid crystal molecules partially stand up by the force having components parallel to the substrate, the contrast in the negative viewing direction can be improved. Improvement in the viewing angle characteristic of the liquid crystal display is thus achieved.

The step of forming each pixel in a comb-like shape or with a slit-like opening can be performed simultaneously with the usual pixel patterning step. Accordingly, liquid crystal displays having good display quality and high reliability can be produced at low cost.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display comprising a pair of wiring substrates disposed opposite each other sandwiching a liquid crystal layer therebetween, each of said substrates having a plurality of electrodes formed on a liquid crystal layer side thereof, each pair of electrodes on said substrates forming a pixel, wherein one or more slit-like openings are formed per pixel in each of said electrodes on at least one of said substrates, each of said openings extending longitudinally in a direction perpendicular to an average orienting direction of liquid crystal molecules projected on said substrate, and each region forming one pixel on one substrate is made larger than a corresponding region forming one pixel on the other substrate by an arbitrary value in directions parallel to said average orienting direction, said opposing electrodes being displaced relative to each other in two directions parallel to said average orienting direction in a manner such that first and second areas are provided on opposite sides of said slit-like opening in the one pixel wherein liquid crystal molecules may simultaneously be caused to line up differently in said first area than in said second area due to differently slanted electric fields in the respective areas in order to improve viewing characteristics of the display.

2. The display of claim 1, wherein said slit-like openings are oriented such that a first electric field slanting in a first direction may be provided in said first area and a second electric field slanting in a second direction different from the first direction may be provided in said second area, and wherein each of the electric fields is at least partially upstanding relative to the corresponding substrate.

3. The display of claim 1, wherein liquid crystal molecules are controlled by a pair of opposing electrodes on respective ones of said substrates on opposite sides of said liquid crystal layer throughout substantially the entire one pixel.

4. A liquid crystal display comprising:

a pair of wiring substrates disposed opposite each other sandwiching a liquid crystal layer therebetween, each of said substrates having a plurality of electrodes formed on a liquid crystal layer side thereof, each pair of electrodes on said substrates forming a pixel;

wherein one or more slit-like openings are formed per pixel in each of said electrodes on at least one of said substrates, each of said openings extending longitudinally in a direction perpendicular to an average orienting direction of liquid crystal molecules projected on said substrate;

wherein each region forming one pixel on one substrate is made larger than a corresponding region forming one pixel on the other substrate by an arbitrary value in directions parallel to said average orienting direction, and said opposing electrodes being displaced relative to each other in two directions parallel to said average orienting direction; and wherein said slit-like openings are formed in said pixels on both of said substrates, said slit-like openings on one substrate being displaced from said slit like openings on the other substrate in such a manner that said slit-like openings on said one substrate are positioned alternately between said slit-like openings on said other substrate along directions parallel to said orienting direction.

5. A liquid crystal display comprising:

a pair of wiring substrates disposed opposite each other sandwiching a liquid crystal layer therebetween, each of said substrates having a plurality of electrodes formed on a liquid crystal layer side thereof, each pair of electrodes on said substrates forming a pixel;

wherein one or more slit-like openings are formed per pixel in each of said electrodes on at least one of said substrates, each of said openings extending longitudinally in a direction perpendicular to an average orienting direction of liquid crystal molecules projected on said substrate;

wherein each region forming one pixel on one substrate is made larger than a corresponding region forming one pixel on the other substrate by an arbitrary value in directions parallel to said average orienting direction, and said opposing electrodes being displaced relative to each other in two directions parallel to said average orienting direction; and wherein a width of each of said slit-like openings is not smaller than a spacing between said pair of wiring substrates.

6. A liquid crystal display comprising:

a pair of wiring substrates disposed opposite each other sandwiching a liquid crystal layer therebetween, each of said substrates having a plurality of electrodes formed on a liquid crystal layer side thereof, each pair of electrodes on said substrates forming a pixel;

wherein one or more slit-like openings are formed per pixel in each of said electrodes on at least one of said substrates, each of said openings extending longitudinally in a direction perpendicular to an average orienting direction of liquid crystal molecules projected on said substrate;

wherein each region forming one pixel on one substrate is made larger than a corresponding region forming one pixel on the other substrate by an arbitrary value in directions parallel to said average orienting direction, and said opposing electrodes being displaced relative to each other in two directions parallel to said average orienting direction; and wherein said liquid crystal molecules are provided with a pretilt angle of 0°.

7. A liquid crystal display comprising:

a pair of substrates disposed opposite each other sandwiching a liquid crystal layer therebetween;

electrodes formed on a liquid crystal layer side of each of said substrates;

a matrix array of pixels each formed between a pair of opposing electrodes on said substrates; and wherein each of said electrodes provided on one of said paired substrates and corresponding to one pixel is formed in a comb-like shape with teeth thereof extending substantially parallel to an average orienting direction of molecules of said liquid crystal layer projected on said substrate in a manner such that first and second liquid crystal areas are provided in the one pixel wherein liquid crystal molecules may simultaneously be caused to line up differently in said first area than in said second area due to differently slanted electric fields in the respective areas in order to improve viewing characteristics of the display.

8. The display of claim 7, wherein said slit is oriented such that a first electric field slanting in a first direction may be provided in said first area and a second electric field slanting in a second direction different from the first direction may be provided in said second area, and wherein each of the electric fields is at least partially upstanding relative to the corresponding substrate.

9. The display of claim 7, wherein liquid crystal molecules are controlled by a pair of opposing electrodes on respective ones of said substrates on opposite sides of said liquid crystal layer throughout substantially the entire one pixel.

10. A liquid crystal display comprising:

a pair of substrates disposed opposite each other sandwiching a liquid crystal layer therebetween;

electrodes formed on a liquid crystal layer side of each of said substrates;

a matrix array of pixels each formed between a pair of opposing electrodes on said substrates, wherein each of said electrodes provided on one of said paired substrates and corresponding to one pixel is formed in a comb-like shape with teeth thereof extending substantially parallel to an average orienting direction of molecules of said liquid crystal layer projected on said substrate; and wherein a spacing between said teeth of said electrodes is not smaller than a spacing between said pair of substrates.

11. A liquid crystal display comprising:

pair of wiring substrates disposed opposite each other sandwiching a liquid crystal layer therebetween;

electrodes formed on a liquid crystal layer side of each of said substrates;

a matrix array of pixels each formed between a pair of opposing electrodes on said substrates; and wherein each of said electrodes provided on one of said paired substrates and corresponding to one pixel is provided with one or more open slits that are formed extending substantially parallel to an average orienting direction of molecules of said liquid crystal layer projected on said substrate in a manner such that first and second liquid crystal regions are provided in the one pixel on opposite sides of said slit, and wherein liquid crystal molecules may simultaneously be caused to line up differently in said first area than in said second area due to differently slanted electric fields in the respective areas in order to improve viewing characteristics of the display.

12. The display of claim 11, wherein liquid crystal molecules are controlled by a pair of opposing electrodes on respective ones of said substrates on opposite sides of said liquid crystal layer throughout substantially the entire one pixel.

13. A liquid crystal display comprising:

a pair of substrates disposed opposite each other sandwiching a liquid crystal layer therebetween;

electrodes formed on a liquid crystal layer side of each of said substrates;

a matrix array of pixels each formed between a pair of opposing electrodes on said substrates, wherein each of said electrodes provided on one of said paired substrates and corresponding to one pixel is provided with one or more open slits formed in a manner extending substantially parallel to an average orienting direction of molecules of said liquid crystal layer projected on said substrate; and wherein a width of each of said slits of said electrodes is not smaller than a spacing between said pair of substrates.

* * * * *

UNITED STATES PATENT AND TRADEMARK OFFICE
Certificate

Patent No. 6,141,077                                             Patented: October 31, 2000

On petition requesting issuance of a certificate for correction of inventorship pursuant to 35 U.S.C. 256, it has been found that the above identified patent, through error and without any deceptive intent, improperly sets forth the inventorship.
Accordingly, it is hereby certified that the correct inventorship of this patent is: Mitsuaki Hirata Signed and Sealed this Twenty-Fourth Day of April, 2001.

WILLIAM L. SIKES
*Supervisory Patent Examiner*
Art Unit 2871

UNITED STATES PATENT AND TRADEMARK OFFICE
Certificate

Patent No. 6,141,077                                                      Patented: October 31, 2000

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Mitsuaki Hirata et al.

Signed and Sealed this Sixth Day of November 2001.

WILLIAM L. SIKES
*Supervisory Patent Examiner*
Art Unit 2871